United States Patent
Bayer et al.

(10) Patent No.: US 9,697,544 B1
(45) Date of Patent: Jul. 4, 2017

(54) SYSTEM AND METHOD FOR GENERATING INFORMATION RELATING TO A VEHICLE'S HISTORY

(71) Applicant: Carfax, Inc., Centreville, VA (US)

(72) Inventors: Gerald A. Bayer, Scottsdale, AZ (US); Richard T. Raines, Arlington, VA (US)

(73) Assignee: Carfax, Inc., Centreville, VA (US)

( * ) Notice: Subject to any disclaimer, the term of this patent is extended or adjusted under 35 U.S.C. 154(b) by 0 days.

(21) Appl. No.: 14/665,806

(22) Filed: Mar. 23, 2015

Related U.S. Application Data

(63) Continuation of application No. 12/757,370, filed on Apr. 9, 2010, now abandoned, which is a continuation of application No. 10/619,542, filed on Jul. 16, 2003, now abandoned.

(51) Int. Cl.
  G06Q 10/00    (2012.01)
  G06Q 30/02    (2012.01)
  G06Q 10/06    (2012.01)

(52) U.S. Cl.
  CPC ....... G06Q 30/0278 (2013.01); G06Q 10/067 (2013.01)

(58) Field of Classification Search
  CPC ...... G06Q 50/01; G06Q 10/10; G06Q 30/016; G06Q 30/02; G06Q 30/0281; G06Q 30/06; G06Q 30/0278; G06Q 10/067
  See application file for complete search history.

(56) References Cited

U.S. PATENT DOCUMENTS

2001/0032136 A1* 10/2001 Jang .............. G06Q 30/02
                                                           705/14.69
2002/0194051 A1* 12/2002 Hall .............. G06Q 10/04
                                                           705/7.31

OTHER PUBLICATIONS

Carfax.com, archive date of Sep. 17, 2001, http://web.archive.org/web.20010917020421/http://www.carfax.com/.*

* cited by examiner

Primary Examiner — Gerardo Araque, Jr.
(74) Attorney, Agent, or Firm — Fish & Richardson P.C.

(57) ABSTRACT

A system and method for generating information relating to a vehicle's history. In one embodiment, the method includes the steps of identifying records in a database, identifying a target record, identifying a trigger record, determining if the target record indicates an ownership transfer based on the identified trigger record, and generating a price adjustment for the vehicle at least partially based on the ownership transfer. In accordance with another aspect, a vehicle history information system is provided including a database having vehicle history records, a vehicle history report module adapted to retrieve vehicle history records, an ownership module adapted to identify a target record, identify a trigger record, and determine whether the target record indicates an ownership transfer based on the identified trigger record, and a pricing module adapted to generate a price adjustment for the vehicle at least partially based on the ownership transfer.

17 Claims, 17 Drawing Sheets

VIN CHECK

PLEASE ENTER THE VIN YOU WANT A CARFAX REPORT FOR, SO IT CAN BE VALIDATED BEFORE YOUR ORDER IS PROCESSED.

VIN: ⬜

A VIN MUST BE EXACTLY 17 CHARACTERS LONG; THE LETTERS "I", "O" OR "Q" NEVER APPEAR.

NO RISK - INSTANT MONEY BACK GAURANTEE!

CONTINUE MY ORDER

GET EVERY PENNY BACK IF NOT 100% SATISFIED!

SECURE APPLICATION

 OUR CREDIT CARD PROCESSING, SECURED BY VERISIGN, ALLOWS US TO PROVIDE YOU WITH IMMEDIATE ACCESS YOUR CARFAX REPORT. OUR SECURE SERVER ENCRYPTS YOUR PRIVATE INFORMATION TO PROTECT YOUR TRANSACTION.

BENEFITS OF CARFAX REPORTS:
- GET THE REAL HISTORY FOR ONLY $14.99
- 100 % MONEY-BACK GUARANTEE
- ON-SCREEN RESULTS IN SECONDS

*FIG. 4*

OWNERSHIP HISTORY:

 CARFAX ESTIMATES THAT THIS 1998 FORD ESCORT SE (3FAFP15P9WR259859) HAS HAD 2 OWNER(S). CARFAX ANALYZED THIS VEHICLE'S TITLE HISTORY AND OTHER SUPPORTING EVENTS TO IDENTIFY POTENTIAL OWNERSHIP TRANSFERS. IN COMPLIANCE WITH THE U.S. PRIVACY LAWS, CARFAX DOES NOT COLLECT OR REPORT OWNER NAMES OR ADDRESSES.

↗ 107

| ESTIMATED OWNERS: | DATE: | LOCATION: |
|---|---|---|
| 1ST OWNER | 08/20/1998 | PENNSYLVANIA |
| 2ND OWNER | 08/01/2002 | VIRGINIA |

CARFAX OWNERSHIP HISTORY PRICE ADJUSTMENT® PATENTED

 BUYING OR SELLING THIS VEHICLE? BASED ON THIS 1998 FORD ESCORT SE'S 2 ESTIMATED OWNERS AND OTHER OWNERSHIP-RELATED FACTORS, YOU SHOULD ADJUST THE BASE PRICE OF THIS VEHICLE BY:

TWO OWNER 1998 FORD ESCORT SE        + $460

| DATE: | ODOMETER READING: | SOURCE: | GENERAL COMMENTS: |
|---|---|---|---|
| 02/28/2001 | | VIRGINIA MOTOR VEHICLE DEPT. CAHNTILLY, VA | VEHICLE OWNER RELOCATED |
| 03/09/2001 | 10,854 | VIRGINIA MOTOR VEHICLE DEPT. CHANTILLY, VA | TITLE OR REGISTRATION ISSUED |
| 12/20/2001 | | AUTO INVENTORY CHANTILLY, VA | VEHICLE OFFERED FOR SALE |
| 03/10/2003 | 23,881 | VIRGINIA INSPECTION STATION CHANTILLY, VA | PASSED EMISSIONS INSPECTION |

*FIG. 9*

| | DATE: | ODOMETER READING: | SOURCE: | GENERAL COMMENTS: |
|---|---|---|---|---|
| 516 → | 02/12/2001 | | BUICK ASSEMBLY PLANT SMYRNA, TN | VEHICLE ASSEMBLED AT GM PLANT |
| 512 → | 04/25/2001 | 15 | MARYLAND MOTOR VEHICLE DEPT. BALTIMORE, MD | TITLE OR REGISTRATION ISSUED |
| 514 → | 04/26/2001 | | MARYLAND MOTOR VEHICLE DEPT. BALTIMORE | REGISTERED AS CORPORATE FLEET VEHICLE |
| | 06/01/2003 | 37,952 | MARYLAND MOTOR VEHICLE DEPT. BALTIMORE, MD | TITLE OR REGISTRATION ISSUED |

| DATE: | ODOMETER READING: | SOURCE: | GENERAL COMMENTS: |
|---|---|---|---|
| 03/05/2001 | | BUICK ASSEMBLY PLANT SMYRNA, TN | VEHICLE ASSEMBLED AT GM PLANT |
| 04/25/2001 | 15 | MARYLAND MOTOR VEHICLE DEPT. BALTIMORE, MD | TITLE OR REGISTRATION ISSUED FIRST OWNER REPORTED |
| 04/26/2001 | | MARYLAND MOTOR VEHICLE DEPT. BALTIMORE | REGISTERED AS CORPORATE FLEET VEHICLE |
| 06/01/2003 | 37,952 | MARYLAND MOTOR VEHICLE DEPT. BALTIMORE, MD | TITLE OR REGISTRATION ISSUED |

*FIG. 10B*

| | DATE: | ODOMETER READING: | SOURCE: | GENERAL COMMENTS: | COMMENTS FOR PATENT APPLICATION |
|---|---|---|---|---|---|
| 554 → | 04/25/2001 | 15 | MARYLAND MOTOR VEHICLE DEPT. BALTIMORE, MD | TITLE OR REGISTRATION ISSUED FIRST OWNER REPORTED | TARGET RECORD 1 DOES NOT QUALIFY AS NEW OWNER RECORD BECAUSE IS ALREADY A FIRST OWNER RECORD |
| 563 → | 05/27/2002 | 18,542 | AUTO INVENTORY BOWIE, MD | VEHICLE OFFERED FOR SALE | TRIGGER RECORD |
| 562 → | 06/11/2002 | | AUTOMOTIVE SERVICES COMPANY | USED VEHICLE SOLD | TRIGGER RECORD |
| 556 → | 07/06/2002 | | MARYLAND MOTOR VEHICLE DEPT. BALTIMORE, MD | TITLE OR REGISTRATION ISSUED | TARGET RECORD 2 ELIGIBLE AS A NEW OWNER RECORD |
| | 05/12/2003 | | MARYLAND INSPECTION STATION BALTIMORE, MD | PASSED EMISSIONS INSPECTION | |
| 558 → | 06/01/2003 | 37,952 | MARYLAND MOTOR VEHICLE DEPT. BALTIMORE, MD | TITLE OR REGISTRATION ISSUED | TARGET RECORD 3 ELIGIBLE AS A NEW OWNER RECORD |
| 564 → | 06/01/2003 | | SERVICE PLAN COMPANY | SERVICE PLAN PURCHASED | TRIGGER RECORD |

*FIG. 11A*

| DATE: | ODOMETER READING: | SOURCE: | GENERAL COMMENTS: |
|---|---|---|---|
| 04/25/2001 | 15 | MARYLAND MOTOR VEHICLE DEPT. BALTIMORE, MD | TITLE OR REGISTRATION ISSUED FIRST OWNER REPORTED |
| 05/27/2002 | 18,542 | AUTO INVENTORY BOWIE, MD | VEHICLE OFFERED FOR SALE |
| 06/11/2002 | | AUTOMOTIVE SERVICES COMPANY | USED VEHICLE SOLD |
| 07/06/2002 | | MARYLAND MOTOR VEHICLE DEPT. BALTIMORE, MD | TITLE OR REGISTRATION ISSUED NEW OWNER REPORTED |
| 05/12/2003 | | MARYLAND INSPECTION STATION BALTIMORE, MD | PASSED EMISSIONS INSPECTION |
| 06/01/2003 | 37,952 | MARYLAND MOTOR VEHICLE DEPT. BALTIMORE, MD | TITLE OR REGISTRATION ISSUED NEW OWNER REPORTED |
| 06/01/2003 | | SERVICE PLAN COMPANY | SERVICE PLAN PURCHASED |

*FIG. 11B*

EXAMPLE: 4 YEAR OLD HONDA ACCORD AT WITH A BASE KELLEY BLUE BOOK VALUE OF $15,000

HOW MUCH WOULD YOU PAY FOR THIS CAR IF YOU DID NOT KNOW THE NUMBER OF OWNERS?
$_____

HOW MUCH WOULD YOU PAY IF YOU KNEW THE CAR HAD...

| | |
|---|---|
| ONE OWNER | $_____ |
| TWO OWNERS | $_____ |
| THREE OWNERS | $_____ |
| FOUR OWNERS | $_____ |
| FIVE OWNERS | $_____ |
| SIX OWNERS | $_____ |
| SEVEN OWNERS | $_____ |

*FIG. 12*

| NUMBER OF PREVIOUS OWNERS → | 1 | 2 | 3 | 4 | 5 | 6 | 7 |
|---|---|---|---|---|---|---|---|
| VEHICLE VALUE + OR - | ++ | + | N | - | -- | --- | ---- |

↖ 624

WHERE:

+ = NUMBER OF OWNERS INCREASES THE VALUE OF VEHICLE AS COMPARED TO BASE PRICE

N = NEUTRAL - DOES NOT CHANGE VALUE OF VEHICLE - STAYS AT BASE PRICE

− = NUMBER OF OWNERS DECREASES THE VALUE OF VEHICLE AS COMPARED TO BASE PRICE

*FIG. 14*

| VEHICLE AGE ↓ / NUMBER OF PREVIOUS OWNERS → | 1 | 2 | 3 | 4 | 5 | 6 | 7 |
|---|---|---|---|---|---|---|---|
| LESS THAN 1 YR OLD | - | -- | --- | ---- | ---- | ---- | ---- |
| 1 YR OLD | N | -- | --- | ---- | ---- | ---- | ---- |
| 2 YR OLD | N | -- | --- | ---- | ---- | ---- | ---- |
| 3 YR OLD | + | N | --- | ---- | ---- | ---- | ---- |
| 4 YR OLD | + | N | -- | - | ---- | ---- | ---- |
| 5 YR OLD | + | + | N | - | -- | ---- | ---- |
| 6 YR OLD | ++ | + | N | - | -- | ---- | ---- |
| 7 YR OLD | ++ | + | N | - | -- | ---- | ---- |
| 8 YR OLD | +++ | + | N | - | -- | --- | ---- |
| 9 YR OLD | +++ | ++ | + | N | - | -- | --- |
| 10 YR OLD [...] | +++ | ++ | + | + | - | - | - |
| 15 YR OLD | ++++ | ++ | + | + | N | - | - |
| 20 YR OLD | ++++ | ++ | + | + | + | N | N |

— 630

WHERE:
+ = NUMBER OF OWNERS INCREASES THE VALUE OF VEHICLE AS COMPARED TO BASE PRICE
N = NEUTRAL - DOES NOT CHANGE VALUE OF VEHICLE - STAYS AT BASE PRICE
− = NUMBER OF OWNERS DECREASES THE VALUE OF VEHICLE AS COMPARED TO BASE PRICE

FIG. 15

SYSTEM AND METHOD FOR GENERATING INFORMATION RELATING TO A VEHICLE'S HISTORY

CLAIM OF PRIORITY

This application is a continuation of application Ser. No. 12/757,370 filed on Apr. 9, 2010 entitled "System and Method for Generating Information Relating to A Vehicle's History", which is a continuation of application Ser. No. 10/619,542 filed on Jul. 16, 2003 entitled "System and Method for Generating Information Relating to A Vehicle's History", the disclosures of which are hereby incorporated by reference as if set forth in full in this document for all purposes.

TECHNICAL FIELD

This invention relates to a system and method for generating records related to the history of a vehicle and, in particular, to a system and method for determining the number of owners of a particular vehicle throughout the vehicle's history and/or determining a price adjustment based on the number of owners.

BACKGROUND OF THE INVENTION

The automotive industry is perhaps one of the largest industries in many industrialized regions of the world. As a result, the market for used vehicles has evolved into a substantial market, especially in North America, and in particular, the United States and Canada.

Those parties involved in the trading of used vehicles recognize the value of information relating to the used vehicle's history in making a purchasing decision including placing a value on the particular vehicle. Consequently, services have been created that function primarily to provide vehicle history information to various parties in the used vehicle market, including dealers and individual consumers. For example, Carfax, Inc., the assignee of the present invention, provides a variety of vehicle history information to both buyers and sellers of vehicles. In particular, Carfax offers a web site at www.carfax.com™, permitting a potential buyer of a vehicle to purchase a vehicle history report containing an extensive collection of information on a particular vehicle. For example, the vehicle history report includes such vehicle history information as model year, odometer readings, accident information, the existence of salvage and/or flood titles and maintenance records.

Perhaps one of the most important pieces of information to a potential buyer about a used vehicle is the number of prior owners. Vehicle owners have varied and unpredictable driving habits and maintenance practices. Therefore, the greater the number of owners, the greater the likelihood that the vehicle has problems, such as hidden damage or excessive wear, due to, for example, aggressive driving and/or poor maintenance. Moreover, a vehicle owned by only one individual throughout the vehicle's history is more likely to have been cared for by the owner to maximize dependability, appearance and resale value, especially during a long ownership period.

Therefore, there exists an unfulfilled need for a system and method for generating vehicle history records that accurately and effectively determines whether a transfer of ownership of a vehicle occurred during its history. This allows accurate determination of the number of owners of the vehicle. There further exists an unfulfilled need for such a system and method that adjusts the value of a vehicle based on the number of owners.

SUMMARY OF THE INVENTION

Determining whether a transfer of ownership has occurred for a particular vehicle is difficult and complex, even if records of the vehicle's history are readily available. Title/registration data may be provided by, for example, a government agency such as, in the U.S., the Department of Motor Vehicles, or equivalent of the states in which vehicles are registered. Thus, first impression suggests that, because vehicle history data provides title/registration records resulting from the number of owners can be easily determined by counting the number of title/registration records that have been issued for a particular vehicle. However, the applicants of the present invention have found that such title/registration records do not necessarily indicate transfer of ownership as it relates to the potential purchaser of the vehicle.

Examples of title records provided in a vehicle history by a vehicle data supplier that appear to indicate ownership transfer but in reality represent situations in which no ownership transfer has occurred include title error corrections, lien discharges and duplicate titles. Another example is a new title record provided when the owner of a vehicle moves from one state to another state. Although a new title is issued by the state where the owner has moved to, the owner is actually the same. Therefore, in these and other instances, simple counting of the title/registration records throughout a vehicle's history would not ensure accurate information regarding the number of owners for a particular vehicle.

In view of the above, one aspect of the present invention is a method for generating information relating to a vehicle's history comprising the steps of identifying records in a database, the records being related to a vehicle and having information relating to the vehicle's history, identifying a target record in the records, the target record indicative of ownership of the vehicle, identifying a trigger record in the records, determining if the target record indicates an ownership transfer in which ownership of the vehicle is transferred from one owner to another owner based on the identified trigger record, and generating a price adjustment for the vehicle at least partially based on the ownership transfer.

Another example embodiment of the present invention is a method for generating information relating to a vehicle's history comprising the steps of identifying target records in a database having information relating to the vehicle's history, the target records being indicative of ownership of the vehicle, determining whether each of the target records indicates an ownership transfer in which ownership of the vehicle is transferred from one owner to another owner, determining a number of owners based on a number of target records that indicate an ownership transfer, and generating a price adjustment for the vehicle at least partially based on the number of owners.

Still another example embodiment of the present invention is a method for generating and displaying title information relating to a vehicle's history comprising the steps of identifying records in a database that relate to a particular vehicle, the records containing data relating to the vehicle's history, identifying a title record and a previous title record, determining whether the title record indicates titling of the vehicle in a different titling region than the previous title record, and if the title record indicates titling of the vehicle in a different titling region than the previous title, then determining whether the titling of the vehicle in the different titling region resulted from a relocation of an owner of the vehicle to the different titling region.

Yet another example embodiment is a method for generating information relating to a vehicle's history comprising the steps of identifying a target record in a database having information relating to the vehicle's history, the target record being indicative of ownership of the vehicle, determining a total number of owners based on the target record, and displaying the total number of owners.

In accordance with another aspect of the present invention, a vehicle history information system adapted to generate information relating to a vehicle's history is provided, the system comprising a database having vehicle history records related to a vehicle and having information relating to the vehicle's history, a vehicle history report module adapted to retrieve vehicle history records for the vehicle from the database, an ownership module adapted to identify a target record indicative of ownership of the vehicle, identify a trigger record, and determine whether the target record indicates an ownership transfer in which ownership of the vehicle is transferred from one owner to another owner based on the identified trigger record, and a pricing module adapted to generate a price adjustment for the vehicle at least partially based on the ownership transfer.

In accordance with another implementation, a vehicle history information system is provided comprising a database having vehicle history records related to a vehicle and having information relating to the vehicle's history, a vehicle history report module adapted to retrieve vehicle history records for the vehicle from the database, an ownership module adapted to determine a number of target records indicating an ownership transfer, and determine a number of owners for the vehicle, and a pricing module adapted to generate a price adjustment for the vehicle at least partially based on the number of owners.

In yet another implementation, a vehicle history information system is provided comprising a database having vehicle history records related to a vehicle and having information relating to the vehicle's history, a vehicle history report module adapted to retrieve a title record and a previous title record for the vehicle from the database, an ownership module adapted to determine whether the title record indicates titling of the vehicle in a different titling region than the previous title record, and if the title record indicates titling of the vehicle in a different titling region than the previous title, then determining whether the titling of the vehicle in the different titling region resulted from a relocation of an owner of the vehicle to the different titling region.

In still another embodiment, a vehicle history information system is provided comprising a database having vehicle history records related to a vehicle and having information relating to the vehicle's history, a vehicle history report module adapted to retrieve vehicle history records for the vehicle from the database, an ownership module adapted to determine a number owners for the vehicle based on the vehicle history records, and a pricing module adapted to generate a price adjustment for the vehicle at least partially based on the number of owners.

In accordance with still another aspect of the present invention, a computer readable medium is provided having instructions to implement one or more of the methods and systems noted.

These and other features of the present invention will become more apparent from the following detailed description of the preferred embodiments of the present invention when viewed in conjunction with the accompanying drawings.

BRIEF DESCRIPTION OF THE DRAWINGS

FIG. 4 is an example displayable file of a user interface that may be generated by the vehicle history information system of the present invention.

FIG. 5 shows an example report summary that may be generated and displayed by the vehicle history information system which specifically identifies the number of owners.

FIG. 9 shows various vehicle history records for an example vehicle.

FIG. 10A shows various vehicle history records for another example vehicle.

FIG. 10B shows the vehicle history records of FIG. 10A with the appropriate target record clearly indicated by a first owner data flag.

FIG. 11A shows various vehicle history records for still another example vehicle.

FIG. 11B shows the vehicle history records of FIG. 11A with the target records clearly indicated with various flags.

FIG. 12 is an exemplary survey that may be used to obtain consumer pricing information.

FIG. 14 shows a diagram which sets forth the number of previous owners and the impact it has on the value of the particular vehicle.

FIG. 15 shows a matrix, which may be derived empirically, that illustrates the relationship between the age of the vehicle and the number of previous owners of the vehicle on the price of the vehicle.

DETAILED DESCRIPTION OF THE PREFERRED EMBODIMENT

Figure 1:
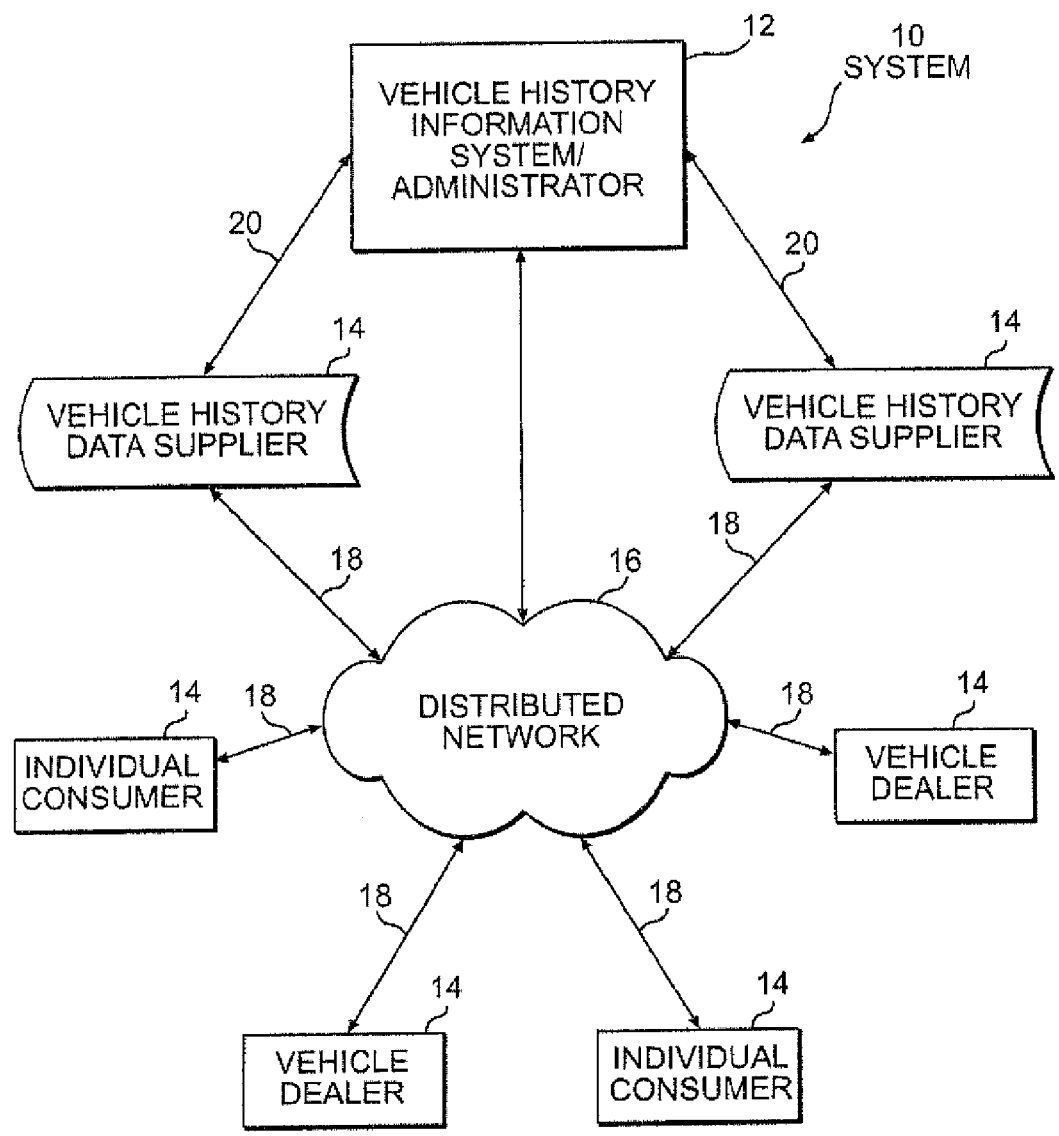
FIG. 1 is a general schematic illustration of a vehicle history information system in accordance with one aspect of the present invention connected to various data suppliers and a distributed network.

Referring to the drawings, FIG. 1 is a highly schematic diagram of a system, for example in the form of a computer network 10, designed to implement the subject invention. FIG. 1 may also be viewed as showing the relationship of the different entities potentially involved in the application of one embodiment of the present invention. Specifically, a computer implemented vehicle history information system 12 exchanges data with a plurality of remote terminals 14 through data transmission across a distributed network 16, e.g. Internet. The terminals 14 represent individual consumers and vehicle dealers accessing vehicle history information system 12, as discussed more fully hereinbelow, to obtain vehicle history information about a particular vehicle. Terminals 14 may also include vehicle history data sources or suppliers which are used by the vehicle history information system administrator to create and update vehicle history information in system 12. The vehicle history data suppliers may include individual consumers, vehicle dealers, state titling offices, Department of Motor Vehicles, auto auctions and any other source of vehicle information.

The distributed network 16 may be any type of communications channel such as a local area network (LAN), wide area network (WAN), direct computer connections, and/or wireless connections using radio frequency, infrared, or other wireless technologies using any appropriate communication hardware and protocols, and may further be the Internet. Thus, terminals 14 may be connected to distributed network 16 by any conventional communication links 18, including hardwired and/or wireless. Moreover, the vehicle history data suppliers may provide information to vehicle history system administrator 12 via any means of effectively communicating vehicle history information, including conventional telephone, facsimile and/or mail services indicated at 20.

Figure 2:
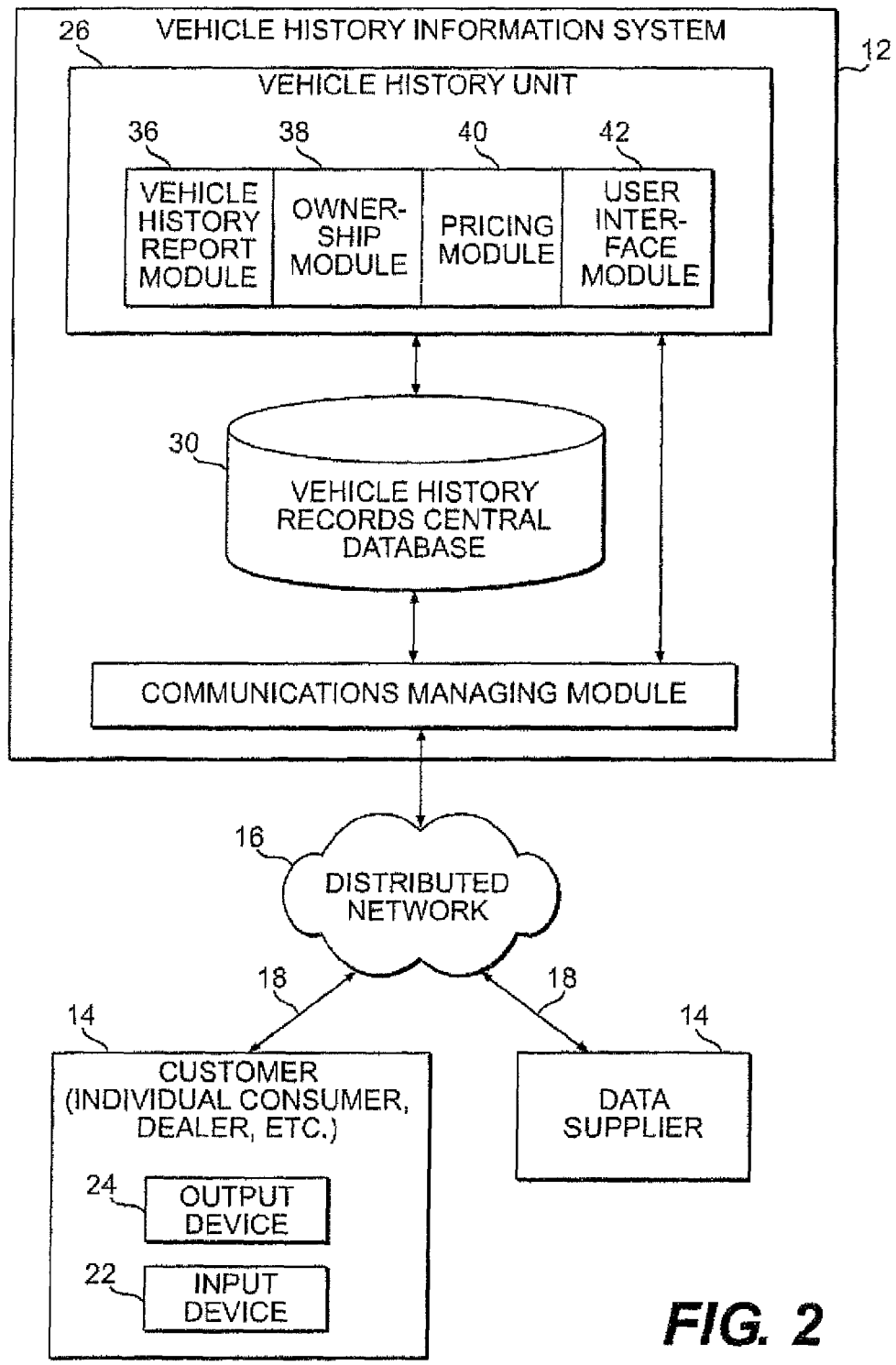
FIG. 2 is a detailed schematic illustration of the vehicle history information system in accordance with one implementation of the present invention.

FIG. 2 illustrates in more detail the vehicle history information system 12 in accordance with one embodiment of the present invention. Generally, vehicle history information system 12 may be implemented with any type of appropriate hardware and software, with portions residing in the form of computer readable storage medium having executable instructions, and computer architecture as discussed hereinbelow. Vehicle history information system 12 may be implemented using a server, personal computer, a portable computer, a thin client, etc. or any combination of such devices. In this regard, vehicle history information system 12 may be a single device at a single location as shown, or multiple devices at a single, or multiple, locations that are connected together using any appropriate communication protocols over any communication medium such as electric cable, fiber optic cable, any other cable, or in a wireless manner using radio frequency, infrared, or other technologies.

FIG. 2 also illustrates in more detail the preferred implementation of the terminals 14. Although only one terminal is shown in detail as the customer terminal, which may include the individual consumers and vehicle dealers of FIG. 1, the details of the customer terminal 14 are equally applicable to the data supplier terminal and all other terminals. Terminal 14 may be any appropriate device for accessing vehicle history information system 12 such as a personal computer, portable computer, thin client, a handheld device such as a mobile phone or PDA, and the like. Terminal 14 includes an input device 22 and an output device 24 which allow the user of the terminal 14 to provide information to, and receive information from, vehicle history information system 12 via the distributed network 16. In this regard, the input device 22 may include a keyboard, mouse, etc. as well as data input devices such as memory devices based on magnetic, optical and/or solid state technologies including disc drives, CD/DVD drives, flash memory, etc. The output device 24 may include a monitor screen, printer, etc. that allow the user of the terminal 14 to obtain the vehicle history information from vehicle history information system 12.

Referring to FIG. 2, in the preferred embodiment, vehicle history information system 12 includes a vehicle history unit 26, a vehicle history records central database 30, and a communications managing module 34, all of which are connected together for effective data communication. Vehicle history unit 26 in one implementation shown includes a vehicle history report module 36, an ownership transfer module 38, a pricing module 40, and a user interface module 42, the functions of each being further described hereinbelow.

It should be noted that the vehicle history information system 12 and the vehicle history unit 40 in accordance with the embodiment of the present invention is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the present invention as schematically embodied in FIG. 2 should not be construed to limit the vehicle history information system 12 of the present invention, but be understood to merely be a schematic example.

Vehicle history records central database 30 contains a comprehensive collection of vehicle history data arranged, organized, indexed and/or retrievable based on the unique vehicle identification number (VIN) of a particular vehicle. Each vehicle sold within the United States and most foreign countries has a unique VIN which is identified on nearly every vehicle title issued and physically identified on the respective vehicle. The VIN is the key to identifying and tracing the public record of each vehicle and to associating different vehicle data collected from a variety of sources with the correct particular vehicle. Thus, as used herein, the phrase "particular vehicle" refers to only one physical vehicle associated with a single VIN and does not refer to general model level information or categories of vehicles, for example, relating to a particular make, model and/or year.

As previously mentioned, the administrator of vehicle history information system 12 acquires vehicle history data from a variety of data suppliers 14. Each item of data acquired and entered into central database 30 is associated with a particular VIN and thus a particular vehicle. The vehicle data is added as a record to central database 30 and indexed by the VIN. When a report is requested as discussed hereinbelow, all records indexed by the same VIN are selected.

Central database 30 may be any conventional database capable of effectively storing collections of records in an organized accessible manner to permit efficient easy access to desired pieces of data, i.e. one or more records, for example, associated with a particular VIN, using appropriate database management system software. Preferably, central database 30 receives information from, and may be accessed by, all components of vehicle history information system 12. The information stored in central database 30 may include, for example, the VIN (which indicates make, model and year); accident information, such as salvage title, junk title, flood damage, fire damage, police accident report and damage disclosure information; mileage information, such as odometer problems and actual mileage listings; title/registration events including government registration, taxi registration and commercial registration; stolen vehicle information; fleet information; emissions and safety inspection information; recall information, and any other information relevant to the vehicle's history. This information is preferably used to create corresponding vehicle records stored in the database and associated with a particular VIN for retrieval, processing and/or display.

In the preferred embodiment, a vehicle history unit 26 includes appropriate hardware and software for implementing the various modules necessary to perform the functions of the vehicle history information system described herein. Vehicle history unit 26 may be implemented as a general purpose computing device with a central processing unit (CPU) or processor. The software for operating the vehicle history unit 26 and of the various modules may reside in a computer readable storage medium in the form of encoded executable instructions for operating the system and performing the functionalities and process steps described herein.

Vehicle history report module 36 functions to access database 30 and retrieve the appropriate records associated, for example, with a particular VIN upon the request by a user. Thus, module 36 includes the appropriate software necessary to select the appropriate vehicle history records from database 30 based on a particular request, i.e. VIN. The vehicle history report module 36 may further be adapted to arrange and organize the vehicle history records and information in a manner appropriate for further data processing and/or display.

User interface module 42 is adapted to utilize the information provided by the vehicle history report module 36 to generate a user interface for delivery to output device 24 of customer terminal 14. User interface module 42 is adapted to generate particular electronically displayable files for delivery to, and display by, output device 24 of customer terminal 14. Communications managing module 34 is adapted to manage communications and interactions between vehicle history information system 12 and its various components, and with the various terminals 14 via the distributed network 16.

Figure 3:
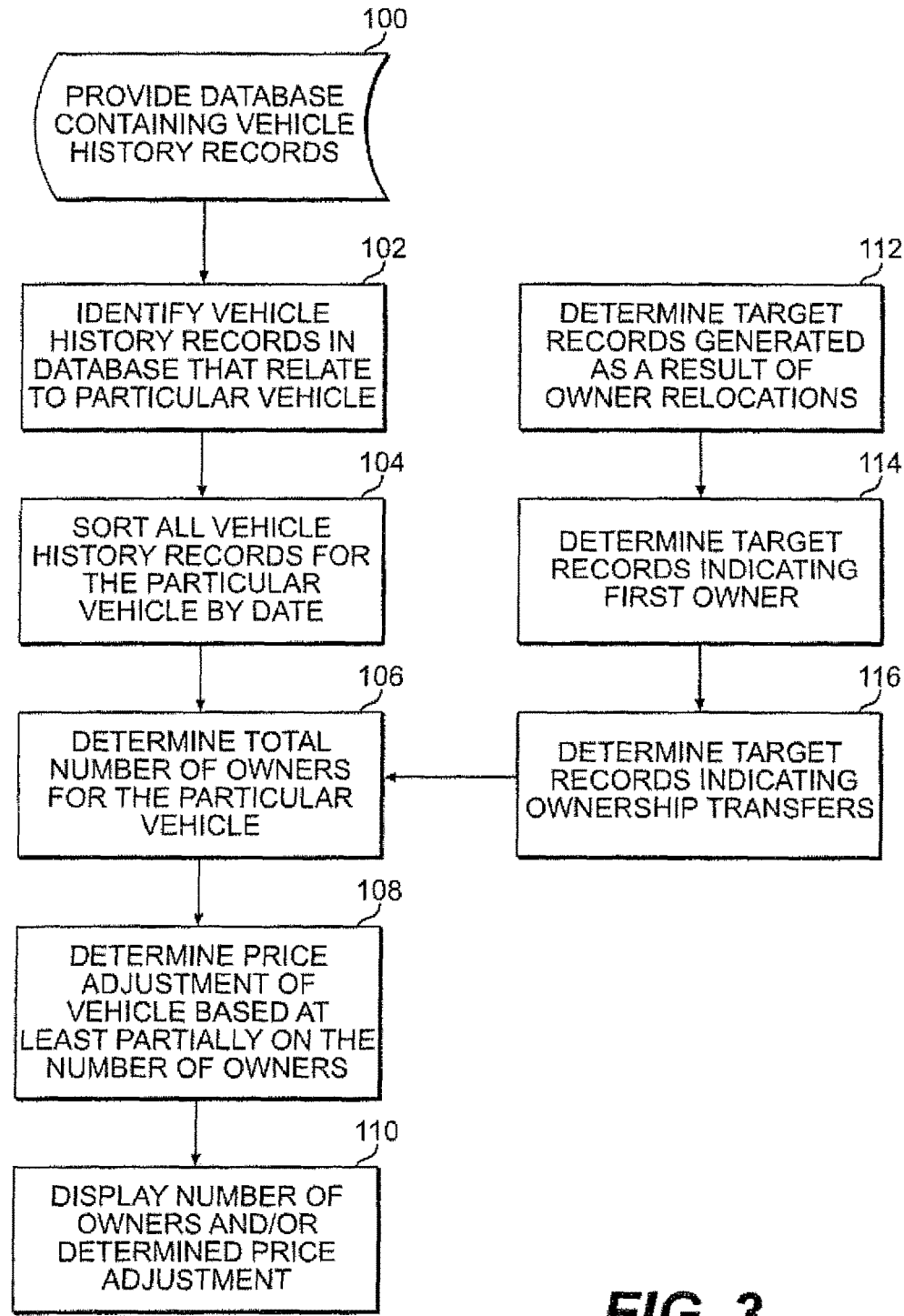
FIG. 3 is a flow diagram of an exemplary method in accordance with another aspect of the present invention.

Referring to FIG. 3, a general representation of the preferred method, corresponding to the system of the present invention of FIG. 2, is illustrated in the form of a flow diagram starting with step 100 in which the vehicle history record central database 30 containing vehicle history records, is provided by, for example, the vehicle history information system administrator. Next, in step 102, vehicle history report module 36 identifies vehicle history records in the central database 30 that relate to a particular vehicle.

Typically, step 102 is performed in response to a customer, i.e. individual consumer or dealer, providing the VIN of a particular vehicle to vehicle history information system 12. In the preferred embodiment, the customer accesses a website containing electronically displayable files having user interfaces for permitting simple, automated communication between the customer and system 12 via distributed network 16. For example, as shown in FIG. 4, an electronically displayable file including a user interface 101 is displayed on the output device 24 of the customer's terminal 14. The customer then enters the particular vehicle's VIN in an input field 103 and elects a "continue my order" button 105 to submit the VIN to system 12 for processing. The VIN request is received by the vehicle history information system 12, via communications managing module 34, which processes the request utilizing vehicle history unit 26.

In the illustrated implementation, vehicle history report module 36 processes the request by selecting all of the vehicle history records in central database 30 relating to a particular VIN in step 102 of FIG. 3. The vehicle history report module 36 of the present implementation is further adapted to sort all the vehicle history records for the particular vehicle, for example, by the dates of the records as shown in step 104.

Using the retrieved records from the central database 30, the vehicle history unit 26 further processes the records using the various modules to allow accurate determination of the number of owners for a particular vehicle in step 106, and, preferably, to provide a vehicle price adjustment based on the number of owners for the particular vehicle in step 108. In this regard, the applicants of the present invention have recognized that generally, vehicles having been owned by fewer owners command a higher value in the marketplace in compared to similar vehicles that have a higher number of owners in the vehicle's history.

Prior art systems known in the art that provide vehicle history information presently cannot provide accurate determination regarding the number of owners for a particular vehicle. As previously noted, first impression suggests that, because vehicle history data provides title/registration records, the number of owners can be easily determined by counting the number of title/registration records that have been issued for the vehicles. However, such title/registration records do not necessarily indicate transfer of ownership since in reality ownership transfer does not occur in certain situations even though a title/registration data is supplied and/or a record for those particular situations exists. For example, situations involving duplicate titles, lien discharges, title error correction and owner relocation/moving, result in new title/registration records where in fact no transfer in vehicle ownership has occurred. Therefore, simple counting of the title/registration records would not ensure accurate determination of the number of owners for a particular vehicle.

A system and/or method capable of providing vehicle price adjustments based on the number of owners is presently not available and the ability to provide such adjustments is made especially difficult because there is no known method for determining the number of owners in a substantially automated manner.

In view of the above, the system and/or method of the present invention generally identifies those title/registration records, hereinbelow referred to as target records, that relate to a particular VIN without initially knowing which title/registration records represent an actual ownership transfer and which do not. The system and/or method then determines which title/registration records qualify as representing ownership and which title/registration records do not likely represent actual vehicle ownership transfers, by identifying and/or comparing other information and records, hereinbelow referred to as trigger records. Specifically, in the preferred embodiment, the system and/or method looks for one or more of these other records within predetermined time interval limits around the dates of the title/registration records that suggest or support, or do not suggest or support, the existence of an actual ownership transfer. Then, based on certain factors, such as the type of the other records and/or the chronological positioning of the other records relative to time interval limits, the system and/or method concludes whether or not a particular title/registration record qualifies as an ownership transfer record.

Specifically, the ownership module 38 of the vehicle history unit 26 is adapted to accurately determine the total number of owners in step 106 based on the vehicle history records that are stored in the central database 30. In this regard, the ownership module 38 is adapted to recognize when a record is generated as a result of the owner of the vehicle moving or relocating to a different state which results in the issuance of a new title and/or registration in step 112. In addition, in step 114, the ownership module 38 accurately determines which vehicle history record identifies first ownership of the vehicle thereby indicating the first owner. Furthermore, in step 116, the ownership module 38 determines which of the vehicle history records indicate ownership transfers. The number of owners may be counted using a subroutine or other appropriate algorithm.

The number of owners determined in step 106 can then be used by the pricing module 40 to determine an adjustment in the price of the vehicle based on the number of owners so that the price is based at least partially on the number of owners as shown in step 108. Finally, in accordance with the illustrated method of FIG. 3, the number of owners, the determined price adjustment and/or a final adjusted price is displayed for the user of the vehicle history information system 12. For example, FIG. 5 shows a report summary that may be displayed which specifically identifies the total number of owners in the field 107. Of course, the total number of owners may be displayed in any manner and the display as shown in field 107 of FIG. 5 is merely one example. In this regard, the total number of owners may be provided to the user of the vehicle history information system 12 in any manner such as in a report summary paragraph, under a separate header, or as a bulleted listing. Furthermore, FIG. 5 also shows an example report summary that may be displayed which specifically sets forth the determined price adjustment in the price adjustment field 581 as described in further detail below.

Figure 6:
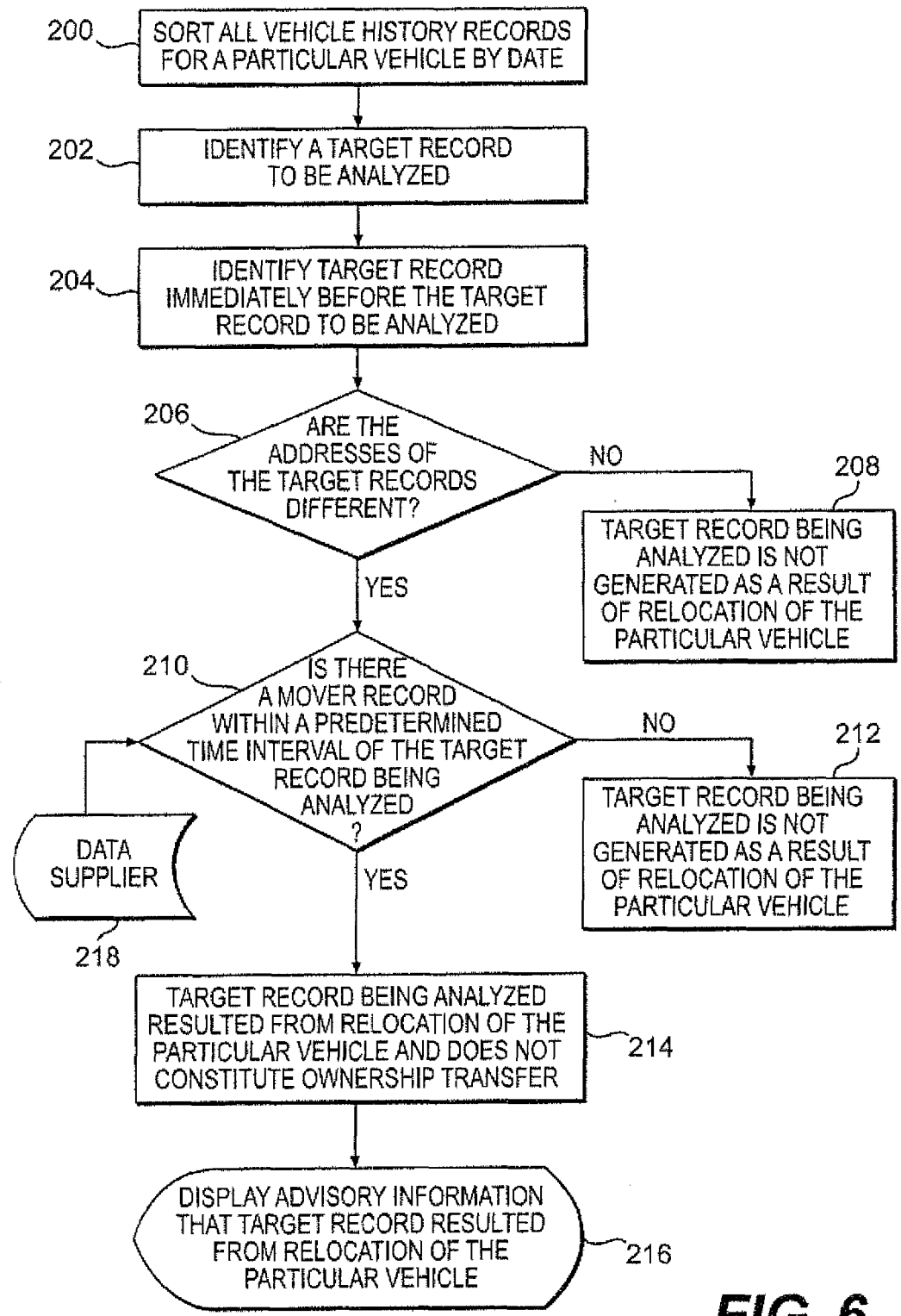
FIG. 6 shows a flow diagram of an exemplary method for determining whether a vehicle history record is generated based on relocation of the owner of the vehicle from one region to another region.

FIG. 6 shows a flow diagram of an exemplary method in which the ownership module 38 can determine whether a vehicle history record suggestive of ownership transfer, is in fact indicative of an ownership transfer, or is generated based on relocation of the owner of the vehicle from one region to another region, for example, from one state to another state, which typically requires issuance of a new title and/or registration by a registration or titling agency, such as the DMV of the new state. In particular, as shown in FIG. 6, the method executed by the ownership module 38 of the illustrated embodiment includes step 200 in which all of the vehicle history records for a particular vehicle is sorted by date. In step 202, a target record is identified, the target record being an issued title and/or registration and having a date and an issuing region such as a state, associated thereto. For example, a target record may be a title issued by the Commonwealth of Virginia on a particular date.

The method also includes step 204 in which a previous target record that immediately precedes the target record being analyzed is identified, the previous target record also having a date and an issuing region associated thereto. Then the method of the present embodiment includes the step of determining whether the issuing regions of the target records are different. If the issuing regions are not different, the target record being analyzed does not qualify as a relocation as shown in block 208 since the target records have the same issuing regions and another target record can then be analyzed.

However, if the issuing region of the target record being analyzed is different from the issuing region of the previous target record, the ownership module 38 searches the vehicle history records for a mover record within a predetermined time interval of the target record being analyzed as set forth in step 210. The predetermined time interval, for example, may be within approximately 60 days before the date of the target record being analyzed, and within approximately 30 days after the date of the target record being analyzed. Of course, in other embodiments, other time intervals may be used instead.

If the mover record is not found in step 210, the ownership module 38 determines that the target record being analyzed does not qualify as a relocation as shown in block 212 and another target record can then be analyzed. However, if there is a mover record within the predetermined time interval of the second target record, the ownership module 38 determines that ownership transfer did not occur between the target record being analyzed and the previous target record, and that the target record being analyzed resulted from relocation of the owner of the vehicle to a different issuing region as shown in block 214. Furthermore, the ownership module 38 may be further adapted to display an advisory informing that the second target record is related to the relocation of the vehicle without ownership transfer as shown in block 216.

Referring to step 210 in which the ownership module 38 looks for a mover record within a predetermined time interval, a mover record is any vehicle history record indicating that a relocation or a move has occurred. In one implementation, the mover records are preferably stored in the central database 30 along with other vehicle history records, and associated with a particular VIN. The mover records may be provided by, or created from relocation or mover data provided by, any vehicle history data supplier 218. Upon obtaining such data or records from a vehicle history data supplier, a mover record is generated and stored in the vehicle history records central database 30 for each instance in which a relocation is indicated by the data supplier 218.

Thus, in accordance with the method of FIG. 6, the ownership module 38 of the vehicle history unit 26 identifies which of the target records are generated as a result of a relocation by the owner of the vehicle, and not as a result of an actual ownership transfer. Such target records that result from relocation of the owner do not count as being an ownership transfer since, in fact, the owner of the vehicle has not changed.

Figure 7:
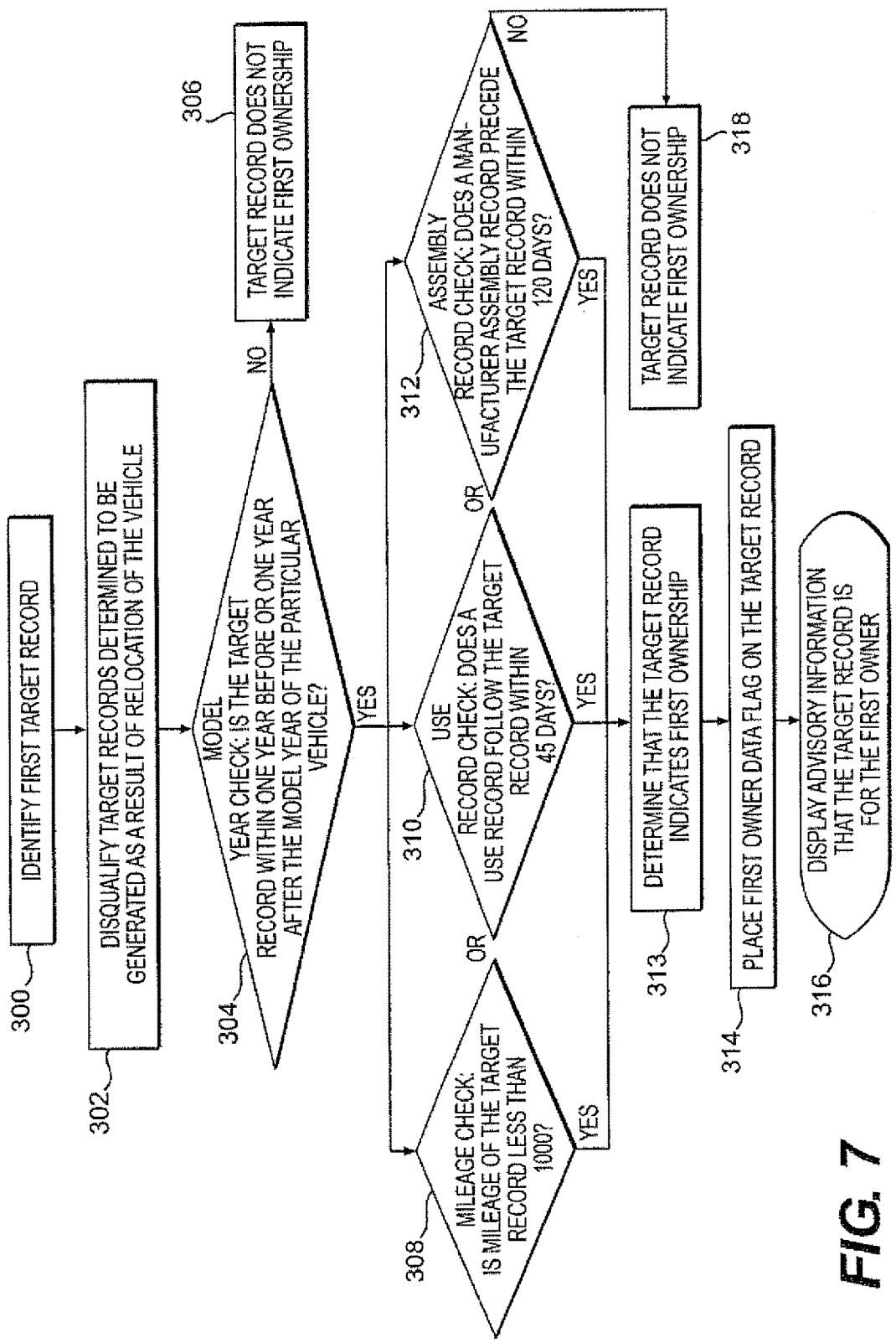
FIG. 7 shows a flow diagram of an exemplary method for determining which target record indicates first ownership.

Referring again to FIG. 2, in addition to determining which of the target records are generated by relocation and do not actually indicate ownership transfer, the ownership module 38 of the vehicle history unit 26 is further adapted to determine which of the target records stored in the vehicle history record central database 30 is indicative of the first ownership of the particular vehicle, and thereby, identify the target record indicating the first owner. In this regard, FIG. 7 shows a flow diagram which describes one method that may be implemented by the ownership module 38 to determine which target record indicates first ownership.

In accordance with the illustrated method, a first target record for the particular vehicle is identified in step 300. Target records that are indicated as being generated as a result of an ownership relocation are disqualified in step 302 so that they are not eligible to be considered as a first ownership record. As previously described, the target records may be determined to be generated as a result of an ownership relocation in accordance with the method of FIG. 6, or in any other appropriate manner.

Then, in accordance with the present embodiment, each target record is further analyzed in the manner described hereinbelow to determine whether the target record is indicative of first ownership. In particular, a model year check is conducted in step 304 on the target record by determining whether the date of the target record is within a predetermined time interval from the vehicle's model year.

The predetermined time interval may be within approximately one year before, or within approximately one year after, the model year of the vehicle. Of course, the one year time interval is provided as an example only and a different time interval may be used in alternative embodiments. If the date of the target record is not within the predetermined time interval from the vehicle's model year, the target record is determined to not indicate a first ownership as shown in block 306 and another target record can then be analyzed.

However, if the target record being analyzed is within the predetermined time interval from the vehicle's model year in step 304 so that the target record may be indicative of first ownership, further analysis is conducted. In particular, if the target record and the data associated therewith satisfy any one of the checks set forth in steps 308, 310 or 312, the target record is determined by the ownership module 38 to be indicative of first ownership.

As shown, in step 308, a mileage check is conducted to determine whether the odometer data of the particular target record being analyzed is less than a predetermined number of miles, for example, less than 1,000 miles. If the mileage is less than 1,000 miles, the target record being analyzed is determined to be indicative of first ownership. Alternatively, in step 310, if a use record follows the target record within a predetermined time period such as within 45 days, the ownership module 38 determines that the target record being analyzed is indicative of first ownership. The use record may be a vehicle history record indicating a particular type of use such as government use, commercial use, company use, lease use, etc. which has been registered with a government agency, such as the DMV. It should be noted that in many regions, such use records are actually registrations. In this regard, it should be evident that trigger records may also be certain types of target records as well in accordance with the present invention.

As a further alternative, an assembly record check is performed in step 312 in which it is determined whether a manufacturer assembly record precedes the target record being analyzed within a predetermined time period, for example, within approximately 120 days. The manufacturer assembly record is a record indicating the completion date of assembly for the particular vehicle and may further provide location information where the vehicle was manufactured. If such a manufacturer assembly record is present, the ownership module 38 of the vehicle history unit 26 determines that the target record analyzed is indicative of first ownership.

As previously discussed, if any of the checks set forth in steps 308, 310 or 312 are satisfied, the target record being analyzed is determined to be indicative of first ownership by the ownership module 38. If none of the tests 308-312 are satisfied, the target record being analyzed is determined to be not indicative of a first ownership as shown in block 318 and another target record can then be analyzed. Of course, in other implementations, not all three checks need be provided. In addition, alternative/different checks may be provided in addition to, or in substitute of, the checks discussed above that provide confirming evidence to facilitate identification of the first owner. Furthermore, in an alternative embodiment, any combination of two or more checks may be necessary before a target record is determined to be indicative of first ownership.

Upon determining that a target record indicates first ownership, a first owner data flag is placed on the target record in step 314 and preferably, an advisory is displayed to the user informing that the target record indicates first ownership in step 316. Thus, the ownership module 38 of the vehicle history unit 26 allows accurate determination of the first ownership of the particular vehicle as described above so that the number of owners for the particular vehicle can be determined. In addition, the ownership module 38 further allows determination of which target records are generated based on relocation by the same owner so that these target records are not counted as being ownership transfers as described previously.

Figure 8:
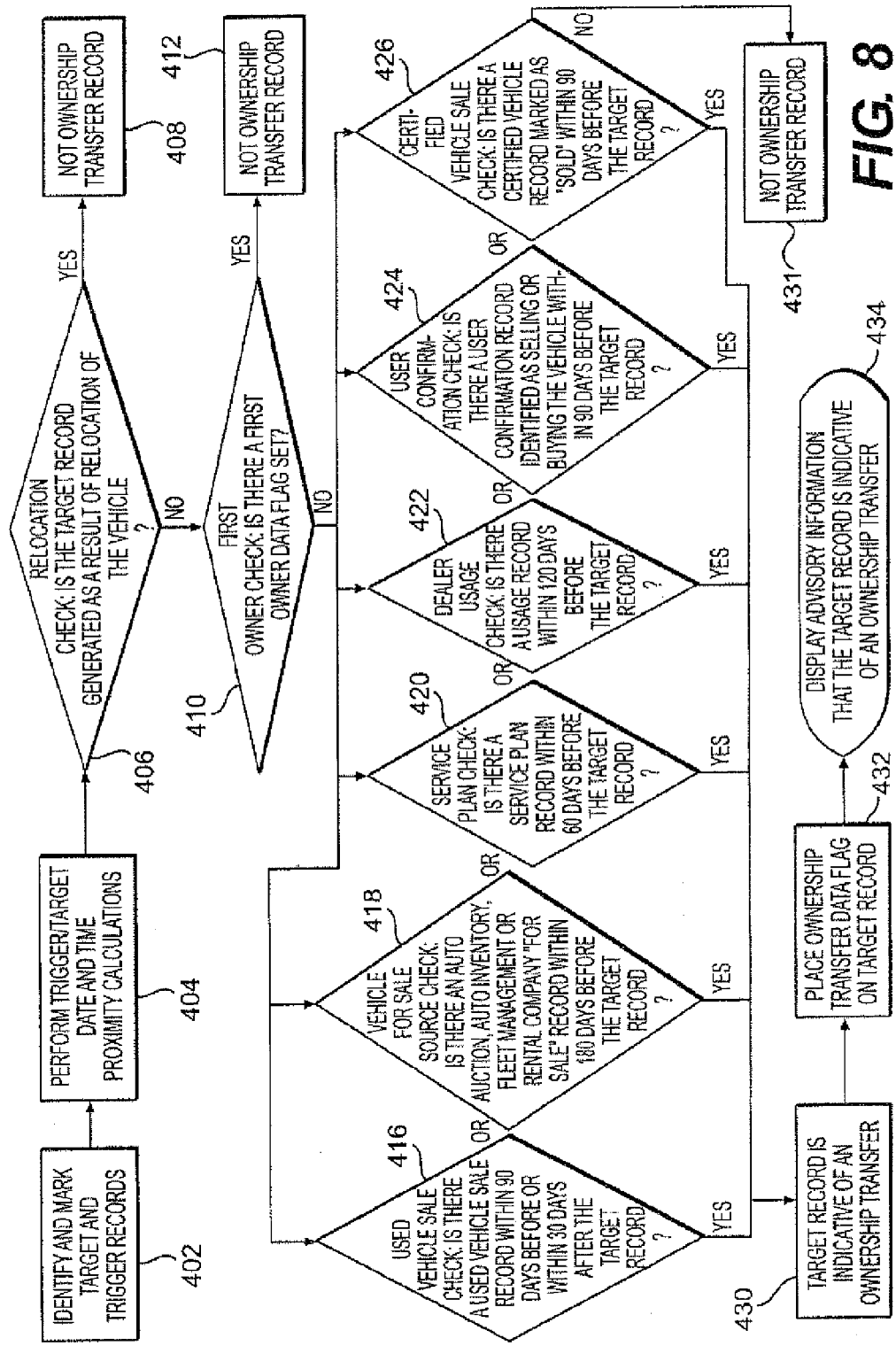
FIG. 8 shows a flow diagram of an exemplary method for determining whether a target record is indicative of an ownership transfer.

Using the above methods, the ownership module 38 in accordance with the illustrated embodiment is further adapted to analyze the vehicle history records of a particular vehicle to determine the total number of owners of the particular vehicle by determining which of the other target records indicate ownership transfers as indicated in step 116 of FIG. 3. FIG. 8 shows a flow diagram of a method that may be used by the ownership module 38 in accordance with one exemplary embodiment of the present invention to determine whether the target records of the vehicle history records stored in the central database 30 are indicative of ownership transfers.

In accordance with the illustrated embodiment, all target records and trigger records of the central database 30 that are associated with a particular vehicle being analyzed are located and marked in step 402. As previously noted, target records are typically issued title records and registration records provided by, for example, the DMV. Trigger records, on the other hand, are specific record types from a particular group of vehicle history data suppliers or from a specific data source. As explained in further detail hereinbelow, such trigger records are used to determine whether a particular target record is indicative of an ownership transfer.

Referring again to FIG. 8, proximity calculations are performed with the target records and the trigger records of the vehicle history records of a particular vehicle in step 404 by determining the time interval between the target records and the trigger records based on the dates of these records. Then, in accordance with the illustrated embodiment, a mover record check is performed in step 406 for each of the target records. This may be attained, for example, in the manner described previously relative to FIG. 6, to determine whether there exists a mover record within a predetermined time interval of the target record. If the target record being analyzed is determined to be generated by the relocation of the vehicle owner, the target record is determined to be not indicative of ownership transfer as shown in block 408 and is disqualified from further analysis so that another target record can be analyzed. Such disqualified target records would not be counted in the determination of the total number of owners in step 106 as shown in FIG. 3.

If the target record being analyzed is not generated as a result of relocation, the target record is further examined in step 410 to determine whether there is a first owner data flag associated thereto, such data flag possibly having been placed in accordance with the method described above relative to FIG. 7, for example. If the target record being analyzed has a first owner flag associated thereto, then the target record is not to be considered as an ownership transfer record as shown in block 412 so that another target record can be analyzed.

If the target record is not disqualified in step 406, or flagged as first ownership record in step 410, the target record is further analyzed by the ownership module 38 in the manner described hereinbelow using various trigger checks 416-426 based on the determined time intervals between the target record and the trigger records that are derived in the proximity calculation step 404. The satisfaction of any one of these trigger checks 416-426 indicates that the target record is indicative of an ownership transfer.

In accordance with the present implementation, a target record is determined to indicate an ownership transfer of the vehicle if the time interval between the target record being analyzed and the trigger record as determined in the proximity calculation step 404 is within a time interval limit that is associated with each of the trigger records of the trigger checks. In this regard, the time interval limits may be a number of days before the date of the target record and/or a number of days after the date of the target record.

In the used vehicle sale check of step 416, the trigger record is a used vehicle sale record that is provided by a third party vehicle data provider such as car dealer that sells used vehicles and, possibly, new vehicles as well. The used vehicle sale record preferably indicates that the vehicle was sold by the car dealer. The time interval limit associated with the used vehicle sale record may be within approximately 90 days before the date of the target record and within approximately 30 days after the date of the target record. Thus, if the ownership module 38 finds a used vehicle sale record within approximately 90 days before the date of the target record, or within approximately 30 days after the date of the target record, the target record is determined to indicate an ownership transfer in step 430.

In the vehicle for sale source check of step 418, the trigger record is a vehicle for sale record from an organization such as an automotive auction, an automotive inventory source, a dealer, a fleet management company, a rental company, or the like. The vehicle sale record indicates that the vehicle, still in possession by the organization such as the auction or dealer, is for sale. The time interval limit associated with the vehicle for sale record trigger may be within approximately 180 days before the date of the target record. Thus, if a vehicle for sale record trigger exists for the particular vehicle which is within approximately 180 days before the date of the target record, the target record is determined to be indicative of an ownership transfer in step 430.

A service plan check is conducted in step 420 where the trigger record is a service plan record indicating purchase of an extended warranty or service plan for the particular vehicle. Such records may be obtained through a third party data supplier including providers of such extended warranties or service plans. The time interval limit that is associated with the service plan record trigger may be within approximately 60 days before the date of the target record. Thus, if a vehicle history record indicates that a service plan has been purchased for the vehicle satisfies the time interval limit noted, the target record is determined to be indicative of ownership transfer in step 430.

In step 422 of FIG. 8, a dealer usage check is performed in which the trigger record is a dealer usage record indicating retrieval of the particular vehicle's history records from the central database 30 by a dealer accessing the vehicle history information system 12, for example, via the distributed network 16. The time interval associated with the dealer usage record may be within approximately 120 days before the date of the target record. Thus, if a dealer usage record exists within 120 days before the target record, the target record is determined to be indicative of an ownership transfer in step 430.

In step 424 as shown in FIG. 8, a user confirmation check is performed in which the trigger is a user confirmation record that indicates the sale of the vehicle. The user confirmation record may be generated based on inputted information from user responses to a questionnaire or a survey that the vehicle has been sold. The time interval limit associated with the user confirmation record may be within approximately 90 days before the date of the target record. Thus, if a user confirmation record exists within the designated time interval limit, the target record is determined to be indicative of an ownership transfer in step 430.

Finally, a certified vehicle sale check is conducted in step 426 in which the trigger record is a dealer sale record indicating sale of a certified vehicle. The vehicle may be certified by the administrator of the vehicle history information system 12 of the present invention. It should be noted that in this regard, the term "certification" as used herein refers to the accuracy of the title and mileage information provided by the vehicle history information system 12 of the present invention, and not to the vehicle's actual mechanical condition. The dealer sale record may take the form of an inventory list in which the dealer can designate certain vehicles as being sold or otherwise unavailable for sale. The time interval limit associated with the dealer certified vehicle sale record may be within approximately 90 days before the date of the target record. Thus, if a dealer certified vehicle sale record is found that satisfies the time interval limit in step 426, the target record is determined to be indicative of an ownership transfer in step 430.

As noted previously, if any of the above described trigger checks 416 to 426 are satisfied, the target record is determined to be indicative of an ownership transfer in step 430 so that the ownership transfers can be counted and provide an accurate number of owners for the particular vehicle. However, if none of the trigger checks are satisfied, the target record is determined to be not indicative of an ownership transfer as shown in block 431 so that another target record can be analyzed.

In accordance with the illustrated embodiment, the method as shown in FIG. 8 also places an ownership transfer data flag on the target records that have been determined to indicate ownership transfer in step 432. This facilitates a preferable step of displaying advisory information to the user in step 434 which informs that a particular target record is indicative of an ownership transfer. Moreover, this also facilitates determination of the total number of owners since the total number of owners can be determined by determining the total number of ownership transfer data flags and increasing it by one to include the first owner.

It should be noted that the time interval limit that are associated with each of the trigger records described above are merely illustrative examples and different time interval limits may be used. However, the applicants of the present invention have found that the noted time interval limits provide a reliable indicator for determining whether a target record, in fact, corresponds to an actual ownership transfer. It should also be noted that these trigger checks may be conducted in the order described, or in any other appropriate order, or may be even conducted simultaneously. Because the target record is determined to be indicative of an ownership transfer if one of these trigger checks are satisfied in the present embodiment, the remaining trigger checks need not be performed thereby conserving the processing requirements of the vehicle history information system 12.

In addition, it should also be noted that in other implementations, not all six trigger checks described above need be provided. Alternative/different trigger checks may be provided in addition to, or in substitution for the checks discussed above to provide confirming evidence to identify actual ownership transfers. Furthermore, in an alternative embodiment, any combination of two or more of the trigger checks may be necessary before a target record is determined to be indicative of ownership transfer.

Thus, it should be apparent to one of ordinary skill in the art that the present invention should not be limited to the triggers and trigger checks described above. For example, in certain states and jurisdictions, title numbers are used which indicates the number of owners. In particular, the state of Pennsylvania utilizes title numbers that indicate the number of owners in the state of Pennsylvania with respect to a particular vehicle. Various other states also change the title number only when there is an ownership transfer. Thus, such title numbers may be used to determine whether a target record is indicative of an ownership transfer and change in the title numbers be used as a trigger record.

The ownership module 38 of the vehicle history unit 26 may also be used to identify target records that do not indicate ownership transfer. One such target record was discussed above (i.e. relocation) but other such target records may also be identified. In particular, duplicate titles, lien discharge, and correction to titles, all represent target records that do not indicate ownership transfer. For example, a target record such as a title that is issued by the state within close proximity to, for instance, a month or two, of an auction sale mostly likely means that a duplicate title was requested for the particular vehicle to be sold. This titling event would, therefore, not be identified as an ownership transfer, but as a duplicate title request by the ownership module 38.

The capability to identify various target records as not indicating an ownership transfer is especially advantageous for analyzing vehicles having been owned in various states such as Ohio, Kentucky, Pennsylvania, and Nebraska that require dealers taking possession of the vehicle to title the vehicles on their lots. The ownership module 38 of the vehicle history unit 26 may be adapted to interpret such titling events which merely show the dealers taking possession of the vehicle as not being an ownership transfer or a first owner as generally understood by consumers.

Furthermore, the ownership module 38 may be further adapted to determine registration patterns which may be used to determine whether a target record is indicative of an ownership transfer. In particular, there is typically a one year or so gap between each vehicle registration. Registration events that are out of sync with that pattern, in conjunction with an absence of a mover record in close proximity would indicate a new owner for the particular vehicle. Thus, such registration pattern may be used to identify target records that are not indicative of ownership transfer.

In addition, the ownership module 38 of the vehicle history unit 26 may be further adapted to utilize cross sell records as trigger records indicative of ownership transfer. In particular, such cross sell records indicate cross selling activities that typically take place around a sale, or a purchase, of the particular vehicle and may be provided by a third party data provider or the like. The service plan check of step 420 described previously above is one example of such cross selling activity, consumers typically purchasing such plans during, or shortly after, the purchase of the vehicle. Thus, as described, the ownership module 38 utilizes the trigger record associated with a service plan purchase as a trigger record for determining whether a target record is indicative of an ownership transfer in step 430.

In a similar manner, various different cross selling records may be utilized as trigger records as well or as alternatives to determine whether a particular target record is indicative of ownership transfer and/or first ownership. For example, prepurchase inspections, preinsurance inspections and/or insurance purchase may be used as trigger records that indicate the target record is in fact, indicative of an ownership transfer or a first ownership for the vehicle. In addition, various subscription services may be used as triggers as well. For example, activation or change of subscriber for vehicle safety services such as OnStar™ and/or LoJack™ may be used as triggers to determine whether the target record is indicative of an ownership transfer. Likewise, activation/change of subscriber for other vehicle related services such as satellite radio services (XM™ radio) may also be used to determine whether a target record is indicative of an ownership transfer in step 430. Of course, such trigger records may be provided by a third party data provider or be obtained by another manner.

Also, various other trigger records may be utilized by the vehicle history information system 12 to determine whether a particular target record is indicative of an ownership transfer. For example, newspaper and online classified records preceding a titling event set forth in the target record would likely provide a good indication that the vehicle ownership has been transferred. Such trigger records may be extracted from publicly accessible databases, for example, via the Internet.

Various other events or records indicating particular events may be utilized by the ownership module 38 of the vehicle history unit 26 to facilitate determination of whether a target record indicates an ownership transfer or not, such events or records being obtained through a third party data provider or other appropriate data sources. For example, lien and loan records that are associated with the title of the vehicle can be used to identify ownership transfers. Such lien and loan records may be records indicating discharge of such loans or liens. Lemon titles and/or manufacturer buy-back records which brand the vehicle's title means that the vehicle has been repurchased by the manufacturer, and the title event will therefore, not be determined as indicating ownership transfer or first owner as generally understood by consumers. Vehicles having salvage titles typically means that the insurance company has repurchased the vehicle as a result of an insurance claim. Furthermore, a repossession record may be provided in the vehicle history records which indicates that the financial institution, from which a vehicle loan was contracted, took ownership of the particular vehicle. The described target records associated with such titling events would not be determined to be indicative of an ownership transfer or first ownership by the ownership module 38 as generally understood by consumers.

Other events or records may be utilized by the ownership module 38 to determine that a particular target record is indicative of ownership transfer. For example, dealer reconditioning records can also be used as trigger records, such dealer reconditioning records indicating that the dealer is preparing the particular vehicle for sale. Insurance information such as new policies, total loss claims, and loss/theft claims may also be used as trigger records to determine whether a specific target record is indicative of an ownership transfer. For certain types of vehicles, U.S. customs and NHTSA import records can identify a vehicle being imported into the United States. Such records can also be used as trigger records to identify the first ownership or ownership transfer. Again, data indicating such events or records may be provided by third party data providers or be obtained in any other appropriate manner.

The ownership module 38 may further be adapted to analyze customer supplied data, for example, through the user interface module 42 and the distributed network 16, where customers can add records into a vehicle's history. Such data would preferably include references to vehicles being purchased or sold with associated dates.

Moreover, various life events of the owner of the particular vehicle being analyzed may be utilized as trigger records to determine whether a target record is indicative of an ownership transfer, such life events being typically marked by the purchase or sale of a vehicle. For example, a severe accident will sometimes lead an owner to sell the vehicle because of bad memories associated with the vehicle. Marriage, divorce, children, issuances of drivers permit or driver licenses are events that are often linked to the purchase of a vehicle. Identifying such events in close proximity to a target record may qualify the target record as being indicative of an ownership transfer or a first ownership record. Credit activity may also identify a family as being in the market for a vehicle, and therefore, their vehicle may be prone to change of ownership. Thus such credit activity may be indicative that the target record associated thereto is an ownership transfer.

Of course, the above noted records and events that may be utilized by the ownership module 38 of the vehicle history unit 26 are merely provided as examples only and other records may be used to aid in determining whether ownership transfer has occurred. Moreover, whereas certain records may be utilized as trigger records, other records and events may be utilized by the ownership module to determine other aspects of the vehicle's ownership history, for example, as described above relative to relocation.

Therefore, in view of the above discussion, it should be now evident to one of ordinary skill in the art how the method as described above relative to FIGS. 3-8 may be utilized by the vehicle history system 12, and in particular, the ownership module 38 of the vehicle history unit 26, to determine the total number of owners for the particular vehicle as shown in step 106 of FIG. 3. Once the total number of owners for the particular vehicle is determined in any appropriate manner, the price adjustment of the vehicle may be determined based at least partially on the number of owners as indicated in step 108 of FIG. 3.

FIG. 9 shows various vehicle history records 500 for a 1999 Acura Integra, the vehicle history records 500 being fabricated and discussed hereinbelow to demonstrate how such vehicle records may be used by the vehicle history information system 12 of the present invention to determine whether a particular target record is indicative of a first owner as discussed above relative to FIG. 7. Thus, the flow diagram of FIG. 7 should be referred to in conjunction with the vehicle history records of FIG. 9 to facilitate understanding.

FIG. 9 shows the various vehicle history records 500 that are retrieved from the central database 30 and which have already been sorted by date in accordance with step 300 of the flow diagram in FIG. 7. In accordance with the present embodiment, the ownership module 38 of the vehicle history unit 26 then identifies the target record for analysis as set forth in step 302. As previously noted, target records are typically issued titles or registrations associated with the vehicle. Thus, in the example vehicle history records 500 of FIG. 9, the first target record 501 is the title or registration issued by Virginia DMV on Mar. 9, 2001 at an odometer reading of 10,854.

In step 302, the target records that are determined to be a result of relocation are disqualified, for example, based on the method as set forth above relative to FIG. 6. Thus, the ownership module 38 of the vehicle history unit 26 looks for a mover record within a predetermined time interval of the first target record. In the example of FIG. 9, a mover record 502 exists having the date of Feb. 28, 2001, approximately nine days before the first target record 501, the relocation record indicating that the vehicle owner relocated. Thus, in accordance with step 302, the target record 501 is disqualified since it is not indicative of first ownership.

It should be noted that the above vehicle history records 500 of FIG. 9 are merely provided as an example and preferably, the mover records are not displayed to customers that are accessing the vehicle history information system 12, but are merely used by the ownership module 38 to determine whether a specific vehicle history record is generated due to a relocation, and to determine the first owner. As previously described, mover record 502 may be obtained from a third party data provider which compares and analyzes the name and address of a new vehicle registration, to the name and address of the previous vehicle registration to provide relocation records to the vehicle history information system 12 of the present invention.

It should further be noted that in the illustrated example discussed above, the target record 501 would also fail the model year check of step 304 described previously because the date of the target record (Mar. 9, 2001) is more than one year after the model year of the vehicle, namely a 1999 Acura Integra in the present example. Therefore, even if a mover record 502 was not present, the target record 501 would still be determined to not indicate first ownership as shown in block 306 of FIG. 7.

FIG. 10A shows vehicle history records 510 for a 2001 Buick LeSabre that illustrates another example of how the ownership module 38 of the vehicle history unit 26 determines whether a particular target record indicates first ownership as described above relative to FIG. 7. The first target record 512 is identified in accordance with step 300, the first target record being the title or registration issued by the Maryland DMV on Apr. 25, 2001 with an odometer reading of 15 miles. Because there is no mover record within a predetermined time interval of the target record 512, the target record 512 is not generated as a result of relocation of the vehicle, and is not disqualified in accordance with step 302. A model year check is conducted in step 304 and because the target record has a date of 2001 and the particular vehicle is a 2001 Buick LeSabre, the model year check is satisfied and further analysis of the target record is conducted using one or more checks described above relative to FIG. 7.

More specifically, mileage check of step 308 is conducted and satisfied by the target record 512 because the target record indicates 15 miles for the vehicle which is well within the mileage limit set forth for the mileage check. Thus, because one of the checks has been satisfied by the target record being analyzed, the ownership module 38 determines that the target record 512 indicates first ownership, only one of the checks needing to be satisfied for this determination as described previously above relative to steps 308 to 312 in FIG. 7.

However, in order to provide an example of how the other checks are used, vehicle history records 510 are further analyzed in the present discussion. Again, this is for discussion purposes only since preferably, the method of the present implementation as shown in FIG. 7 merely requires one of the checks to be satisfied. In performing the use record check 310, the ownership module 38 of the vehicle history unit 26 determines whether a use record follows the target record 512 within a predetermined period of time, for example, 45 days. In the present example, a use record 514 is present which was recorded on Apr. 26, 2001, just one day after the issuance of the title or registration. As shown, the use record 514 indicates that the vehicle (2001 Buick LeSabre) was registered as a corporate fleet vehicle. Therefore, because the use record check of step 310 is satisfied, the target record 512 is determined to be indicative of first ownership in step 313.

Moreover, the target record 512 of the target records 510 further satisfies the assembly record check 312 because a manufacturer assembly record 516 precedes the target record 512 within the predetermined time period, 120 days in the present example. As can be seen, the manufacturing assembly record 516 indicates that the 2001 Buick LeSabre was assembled at a GM plant on Feb. 12, 2001 which is within 120 days of the date of the target record 512. Thus, the target record 512 would be determined to be indicative of first ownership in step 313, even if the other checks were not satisfied. Again, although the target record 512 of the vehicle history records 510 shown in FIG. 10A needs to satisfy one of the three of these checks in the preferred embodiment, all three checks were discussed to further enhance comprehension of the various checks and how they are used in conjunction with vehicle history records.

Once the target record 512 is determined to be indicative of first ownership, a first owner data flag may be placed on the target record 512 as set forth in step 314, and an advisory information is preferably displayed in step 316. In this regard, FIG. 10B shows the vehicle history records that may be displayed to the user through the output device 24 via the distributed network 16 in which the target record 512 is clearly indicated by the owner data flag "First Owner Reported".

FIG. 11A shows vehicle history records 550 for a 2001 Buick LeSabre which are retrieved from the vehicle history record central database 30 of the vehicle information system 12, and analyzed to determine whether each of the target records are indicative of an actual ownership transfer in accordance with the method as described above relative to FIG. 8. As can be seen, due to the relative complexity and the number of vehicle history records 550 that must be analyzed in the example of FIG. 11A, comments are provided on the right hand margin 552 of FIG. 11A, these comments not constituting a portion of the vehicle history record itself, but merely being provided for the understanding of the method of FIG. 8 as implemented by the ownership module 38 of the vehicle history unit 26. Thus, both FIG. 8 and FIG. 11A should be referred to facilitate understanding of the present invention.

Initially, all of the target records and trigger records are identified marked in step 402, records being indicated accordingly in the comments column 552. In particular, in the illustrated example of FIG. 11A, the first target record 554, second target record 556, and a third target record 558 are identified and marked by the ownership module 38 for analysis. Once all of the target records and trigger records have been identified in step 402, proximity calculations are conducted in 404 in which the time intervals between the target records and the trigger records are determined. Then, each of the target records are further analyzed to determine whether they are indicative of an ownership transfer.

The identified target records that are also determined to be generated as a result of a relocation, for example, using the method of FIG. 6, are disqualified and determined to not indicate ownership transfers. In the example of FIG. 11A, none of the target records are disqualified since none of them have a mover record within the predetermined time. Consequently, all of the target records may still be indicative of ownership transfer and are further analyzed in accordance with the method of FIG. 8.

A first owner check is conducted in step 410 in which the ownership module 38 looks for a first owner data flag set in the target record. As shown in FIG. 11A, the first target record 554 is provided with such first owner data flag set 560. Therefore, the first target record 554 is determined to not be an ownership transfer record in block 412. The remaining second target record 556 and the third target record 558 may still be indicative of ownership transfer if they satisfy at least one of the various trigger checks 416-426 described previously relative to FIG. 8.

In particular, a used vehicle sale check is conducted in step 416 in which a determination is made whether a used vehicle sale record trigger is present within 90 days before or within 30 days after the target record. Thus, for the second target record 556 in FIG. 11A dated Jul. 6, 2002, the used vehicle sale record 562 dated Jun. 11, 2002 exists which indicates that the vehicle was sold approximately three weeks prior to the date of the second target record 556. This is well within the time interval limit associated with the used vehicle sale record trigger. Thus, the second target record 556 is determined to be indicative of an ownership transfer in step 430.

However, no such used vehicle sale record exists for the third target record 558 dated Jun. 1, 2003 within the time interval limit associated with the used vehicle sale trigger. Thus, the third target record 558 does not satisfy the used vehicle sale check of step 416 and the vehicle sale source check of step 418 is conducted for the third target record 558. In particular, the ownership module 38 searches the vehicle history records 550 for a for sale record within a time interval limit, for example, 180 days before the date of the target record. Again, no such record exists within the time interval limit. Thus, the third target record still is not determined to be indicative of an ownership transfer.

It is worthwhile to note here that the second target record 556 satisfies the vehicle for sale source check 418 since there is a vehicle for sale trigger record 563 within the time interval limit of the second target record 556. Of course, as previously noted, in the preferred embodiment, the target records preferably need only to satisfy one of the trigger checks to be determined to be indicative of ownership transfer and the discussion of the second target record 556 satisfying the vehicle for sale source check 418 is merely provided to further clarify how the check is conducted using the trigger records.

In view of not satisfying the used vehicle sale check of step 416 or the vehicle for sale check of step 418, a service plan check is conducted for at least the third target record 558 in step 420 in which the ownership module 38 of the vehicle history unit 26 determines whether there exists a service plan record within a time interval limit before the date of the third target record 558. In the vehicle history records 550 of FIG. 11, a service plan record 564 dated Jun. 1, 2003 (same date as the third target record 558) does exists which is within the time interval limit associated with the service plan record trigger. Thus, the third target record 558 satisfies the service plan check of step 420, and is determined to be indicative of an ownership transfer in step 430.

Thus, in view of the above, each of the target records of the vehicle history records 550 shown in FIG. 11 have been analyzed to determine whether they are indicative of ownership transfer in the manner previously described relative to FIG. 8. As described, the first target record 554 was indicated as the first owner and not an ownership transfer record. However, the second target record 556 and the third target record 558 have been determined to be indicative of an ownership transfer based on one of the trigger checks. In particular, the second target record 556 satisfied the used vehicle sale check 416 while the third target record 558 satisfied the service plan check 420.

Had the second target record 556 and/or the third target record 558 not satisfied these trigger checks, the ownership module 38 of the vehicle history unit 26 would continue to analyze these target records to determine whether they satisfy the remaining trigger checks set forth in the method of FIG. 8, namely the dealer usage check of step 422, user confirmation check of step 424, and/or certified vehicle sale check of step 426. As previously described, these trigger checks are conducted in a similar manner in which each of the triggers associated with the trigger checks are associated with a time interval limit that should be satisfied by the target record for the target record to be determined to be indicative of an ownership transfer in step 430.

With respect to the above analyzed example vehicle history records 550 of FIG. 11A, the second target record 556 and the third target record 558 that have been determined to be ownership transfers are preferably flagged with an ownership transfer data flag in step 432, and are displayed with advisory information to the user of the vehicle history information system 12. For example, the ownership transfer data flags 556 and 558 with the text "New Owner Reported" may be displayed as shown in FIG. 11B.

Thus, by allowing determination of the ownership transfers that are associated with the particular vehicle, the ownership module 38 of the vehicle history unit 26 allows accurate determination of the number of owners as set forth in step 106 of the method of FIG. 3. In particular, in the example of FIG. 11A and FIG. 11B, the vehicle history records 550 for the 2001 Buick LeSabre has been analyzed to determine that it has had three owners, the first owner being reported in the first target record 554, the second owner being reported in the second target record 556, and the third owner being reported in the third target record 558.

It should be noted that there may be instances for searching vehicles where their vehicle history records do not provide enough information to determine the first owner or ownership transfers for each of the target records due to the lack of trigger records. In such instances, the vehicle history unit 26 may be adapted to display to the user, merely the available information, such as "Title or Registration Issued" or "Title Event", for example, without further indications such as the identification of the first owner or the new owner as described above.

As previously noted, the number of owners that is determined by the ownership module 30 of the vehicle history unit 26 in the manner described and illustrated above may be used for variety of purposes in providing vehicle history information to the user of the vehicle information system 12. In particular, in the preferred embodiment, the determined number of owners may be used to determine the price adjustment for the vehicle as set forth in step 108 of the flow diagram shown in FIG. 3. As explained, the number of owners can significantly impact the price of the vehicle and its desirability. Thus, the price module 40 of the vehicle history unit 26 is adapted to determine the price adjustment for the particular vehicle based at least partially on the number of owners as determined by the ownership module 38. Of course, in other implementations of the present invention, the total number of owners may be merely displayed to the user as information associated with the vehicle being analyzed, or used in any other manner.

The pricing module 40 may be adapted to determine the price adjustment in any appropriate manner. For example, in one implementation, each additional owner for a particular vehicle may decrease the value of the vehicle by a fixed monetary unit, for example, $250.00. Alternatively, the price adjustment may be implemented as a percentage in which the price of the vehicle is increased or decreased by a certain percentage of the vehicle's base price according to the number of owners for the vehicle. Of course, the number of owners may be utilized to increase the base price of the vehicle as well as described in further detail below.

The price adjustment that is determined by the pricing module 40 of the vehicle history unit 26 may then preferably be displayed to the user of the vehicle history information system 12 so that the base price of the particular vehicle can be adjusted in accordance thereto. An example of how the determined price adjustment may be displayed to the user via the output device 24 of FIG. 2 is shown in the price adjustment field 581 of FIG. 5. The price adjustment field 581 informs the user that the base price of the particular vehicle being analyzed should be adjusted upward or downward. In the example shown, the 1998 Ford Escort SE is indicated to be a two owner vehicle, and the price adjustment field 581 advises the user that the base price of the vehicle should be adjusted upward by $460.00 based on the number of previous owners, the positive sign indicating upward adjustment. Of course, the price adjustment may be displayed to the user of the vehicle history information system 12 in any appropriate manner such as in a report summary, a bulleted list, etc. The price adjustment may of course, be a negative number if, for example, the number of previous owners were higher. Thus, the price adjustment as determined by the pricing module 40 allows the user of the vehicle history information system 12 to increase or decrease the base price of the vehicle to take into consideration the number of previous owners of the particular vehicle.

The base price of the vehicle represents general used car prices that takes into consideration the year, make, model and mileage of the vehicle and may further take into consideration various other factors including optional equipment present on the vehicle. Such base price of vehicles may be obtained from various third party databases that provide such pricing information. For example, base price for the particular vehicle may be obtained from third party pricing databases such as Kelly Blue Book™ (www.kbb.com), NADA Guides™ (www.nadaguides.com), Edmunds™ (www.edmunds.com), or any other appropriate sources of base price information for vehicles. In this regard, the vehicle history information system 12 may be implemented as a website having a link within such third party vehicle pricing databases so that the user of such databases can access the vehicle history information system 12 in accordance with the present invention to obtain price adjustment for adjusting the base price obtained from the third party vehicle pricing databases.

In accordance with one preferred embodiment of the present invention, the price adjustment for the vehicle based on the number of owners may be empirically derived so that the vehicle's base price can be adjusted upward or downward to accurately reflect the impact of the number of owners for the particular vehicle. In this regard, such empirical data indicating the amount of the price adjustment for a particular vehicle may be derived using surveys.

The use of surveys allows the pricing module 40 to determine price adjustment based on how other factors impact a value of the vehicle relative to the number of owners. For example, the impact of the number of owners on the price of a particular vehicle will also invariably depend on the age of the vehicle as well. Therefore, a survey such as that shown in FIG. 12 may be used to obtain information which allows correlation of the price adjustment to the vehicle's age.

In particular, FIG. 12 shows a survey 600 in which the survey respondent, such as the user of the vehicle history information system 12, is presented with a vehicle make and model together with its age and the base price which may be derived from one or more of the vehicle pricing databases such as Kelly Blue Book™ noted previously. In the example shown in FIG. 12, the survey presents a four year old Honda Accord at base price of $15,000.00. The survey 600 then requests the respondent to price the vehicle on what he/she is willing to pay considering the number of owners of the vehicle.

For example, as can be seen, the first question 602 asks how much the user would pay for the four year old Honda Accord if the user did not know the number of previous owners. The question 604 asks the user how much the user would pay if the car had one previous owner. Likewise, question 606 asks how much the user would pay for the vehicle if the vehicle had two previous owners, and question 608 asks how much the user is willing to pay for the vehicle if the vehicle had three previous owners. As can be seen, the survey 600 further requests the user to price the vehicle if the vehicle had four, five, six, and seven previous owners. These various prices for the respective number of owners can then be averaged with responses from other respondents of the survey 600 to derive vehicle prices for each number of previous owners presented on the survey 600.

Figure 13:
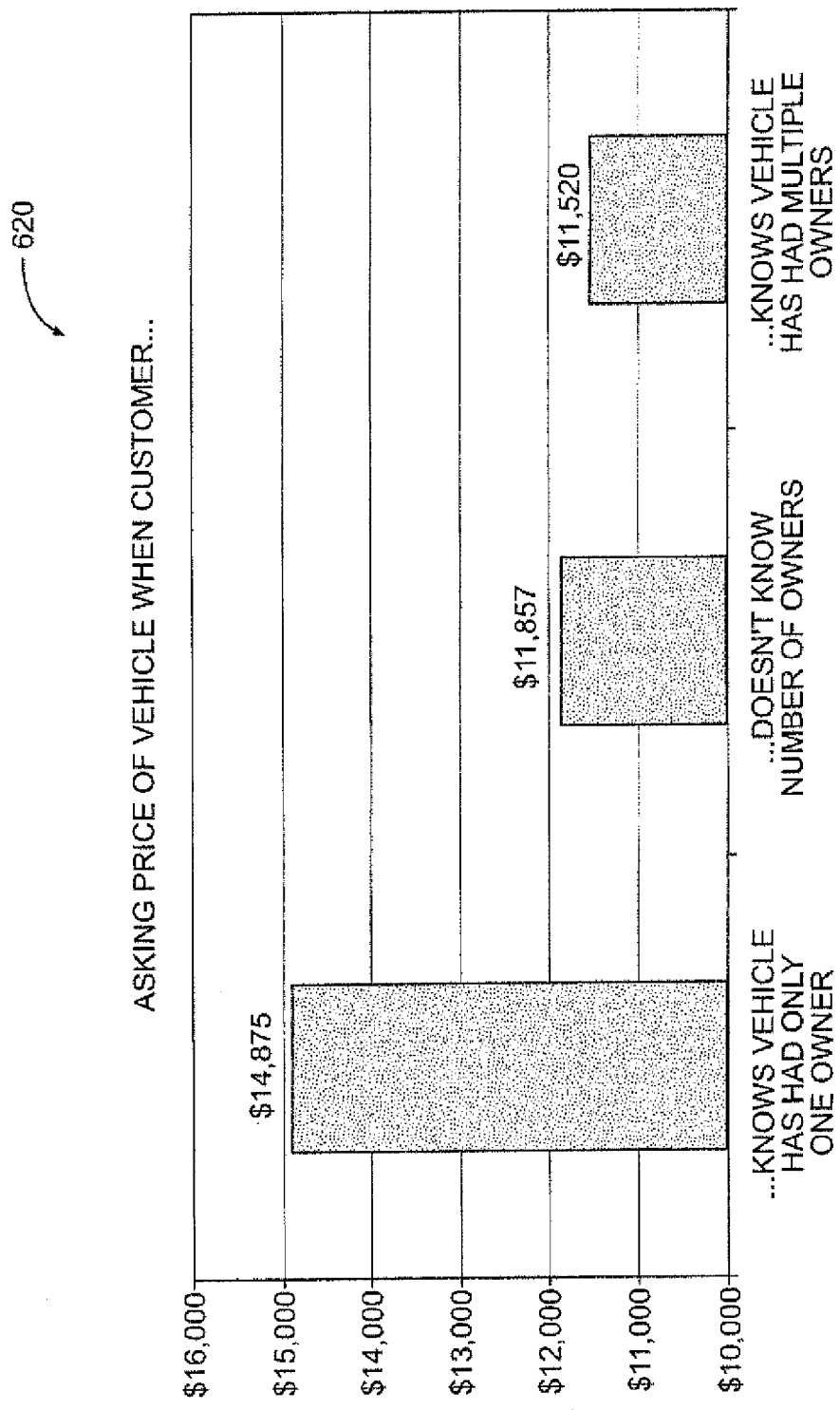
FIG. 13 shows a sampling of survey responses.

FIG. 13 shows a sampling of survey responses that were gathered by asking numerous respondents how much they would pay for a vehicle offered for sale by a used car dealer with asking price of $15,000.00 based on the year, make and model of the vehicle if they do not have any ownership information, if they knew the vehicle had only one previous owner, and if they knew the vehicle had more than one previous owner. As can be seen in the graph 620 of FIG. 13, the respondents were willing to pay a significantly higher price for the vehicle if they knew the vehicle had only one owner. In particular, the vehicle with one owner was worth $14,875.00 while the same vehicle was worth only $11,857 if the number of previous owners were not known. This price of the vehicle if the number of owners were not known is referred to herein as ownership uncertainty price. As also shown in the graph 620, the same vehicle was worth $11,520.00 if it had multiple owners. This empirical study indicates that there is a significant relationship between the number of owners of a vehicle and the value of this vehicle, everything else being equal.

The above described relationship between the price of the vehicle and the number of previous owners can be represented as shown in diagram 624 of FIG. 14 which sets forth the number of previous owners and the impact it has on the value of the particular vehicle. As indicated, each "+" indicates incremental adjustment amount of increase in the base price of the vehicle; "N" represents no change in the base price of the vehicle; and "−" indicates the incremental adjustment amount of decrease in the base price of the vehicle. Each increment of price adjustments can be expressed either as an absolute amount, for example +$300.00, −$560.00, etc., or as a percentage of the base price, for example, +5%, −10% of the base price, etc.

Thus, in interpreting the graph 624 of FIG. 14, the vehicle with only one previous owner is increased in value by two vehicle price adjustments, or amounts corresponding thereto, whereas the vehicle with two previous owners is increased in value by only one vehicle price adjustment. In addition, the value of the vehicle with three previous owners remains neutral and unchanged whereas the value of the vehicle is decreased in value by a number of price adjustments corresponding with a number of previous owners.

In accordance with one implementation, the above noted difference between the ownership uncertainty price, and the value of the vehicle for each number of owners, may be used as the price adjustment amount corresponding to each number of owners known. The pricing module 40 of the vehicle history unit 26 may thus, be adapted to determine the price adjustment to the vehicle's base price by determining the difference between the ownership uncertainty price and the price that is derived from the survey for the corresponding number of previous owners.

For example, in response to the example survey 600 of FIG. 12, it may be determined that the average consumer would pay only $14,000 for the 4 year old Honda Accord if the number of owners is not known, even though the base price as provided by a third party data provider is significantly higher at $15,000. Moreover, the results of the survey 600 may further indicate that if the same Honda Accord was known to have only one owner, the average consumer would pay $16,000. In accordance with one embodiment, the pricing module 40 would determine that the price adjustment for the 2000 Honda Accord that has had only one previous owner as the difference between the owner uncertainty price and the price of such vehicle with one known previous owner so that the price adjustment would be $16,000−$14,000=$2,000. Thus, the base price of $15,000 that is provided by a third party data provider is adjusted by the user to increase the price by the price adjustment provided by the pricing module 40 so that the price of the vehicle is $17,000 ($15,000+$2,000).

Of course, the survey 600 gathers prices the respondents of the survey 600 are willing to pay based on various number of owners and not just for one owner vehicle. The difference between the ownership uncertainty price and each of the prices corresponding to a particular number of owners can then be used by the pricing module 40 as the price adjustments for the particular number of owners. The determined price adjustment that corresponds to the number of owners of a particular vehicle being analyzed are then be provided to the user of the vehicle history information system 12 so that the user can then adjust the base price of the vehicle being analyzed to take into consideration, the number of previous owners.

As previously noted, other ownership related factors may impact the value of a vehicle in combination with the number of previous owners. For example, the impact of the number of owners on the price of a vehicle will also largely depend on the age of the vehicle. Specifically, one would expect the value of a two year old Honda Accord with one owner to not change at all from the base price since a two year old car is somewhat expected to have only had one owner. Therefore, one can expect the price adjustment for the number of owners is 0% of the base price.

On the contrary, the value of a seven year old Honda Accord with only one owner would most likely increase its value, since it is relatively rare to find a seven year old vehicle with one owner. Consequently, buyers will most likely pay a premium for this vehicle and the price adjustment for ownership can reflect this fact, for example, by increasing the base price by 15%. In a similar manner, everything else being equal, the value of the same seven year old Honda Accord with five owners would likely go down significantly as compared to the base price since five owners is likely considered, for example, by surveyed consumers, to be greater than an expected number of owners for a seven year old Honda Accord. Thus, the price adjustment in such an instance may be to deduct 20% off the base price.

The above described relationships can be best illustrated in the matrix 630 of FIG. 15 which may be derived empirically, for example, using survey 600 described above relative to FIG. 12. The matrix 630 utilizes the price adjustment conventions as described relative to graph 624 of FIG. 14. As can be seen, as the age of the vehicle increases, the number of previous owners for the vehicle which does not impact the base price, increases thereby reflecting the fact that users expect the number of previous owners to increase as the vehicle ages. However, if the number of previous owners exceeds the number of owners expected for the age of the vehicle, the price adjustment is made to deduct a certain amount or percentage off the base price. In a similar manner, as clearly shown in the matrix 630 of FIG. 15, if the number of previous owners is significantly less than expected for the age of the vehicle, the price adjustment for the vehicle is increased correspondingly.

Of course, the above described example of FIG. 15 using the age of the vehicle is merely one of a variety of factors that may impact vehicle price adjustment in conjunction with the number of previous owners. For example, various different price points of vehicles, various makes and models representing various categories or types of vehicles, ownership location patterns, ownership time patterns, and ownership mileage patterns, may all effect the vehicle price adjustment in conjunction with the number of previous owners. In this regard, the ownership module 38 in accordance with one embodiment of the present invention that is adapted analyze ownership information allows such factors to be taken into consideration by the pricing module 40 in determining the price adjustment.

For example, it can also be expected that the price adjustment to the price point of the base price for the vehicle will vary depending on the price of the vehicle in conjunction with the number of previous owners. For example, a $40,000 two-year-old Porsche with three previous owners may lose $3,000 of its value or 7.5% of its base price whereas a $6,000 two-year-old Dodge with three previous owners might only lose $1,000 of its value. This price adjustment for the Dodge vehicle, however, represents a 17% decrease of the base price. Comparing both vehicles, one would not expect the Dodge to lose $3000 or 50% of its value since such a loss is unrealistically too large. However, one would not expect the Dodge vehicle to lose the same percent as the Porsche ($6000×7.5%=$450) since such a reduction would be unrealistically too small for a vehicle that is suspect for having three owners in only two years. The price adjustments based on the number of previous owners and the price of the vehicle may be modeled as an equation or be empirically derived, for example, using surveys of consumers for various different vehicles having various ranges of prices, or determined in any other appropriate manner.

The price adjustment for the vehicle will also likely depend on its vehicle category or type, in conjunction with the number of previous owners. For example, three-year-old Ford F250 truck worth $20,000 with three owners may see its price decreased by 8%. However, a three-year-old Ford Thunderbird convertible worth $20,000 with three owners may see no change in price. This phenomenon is attributable to the fact that convertibles (category or type of vehicle) are typically more impulse-driven purchases. Therefore, this category of vehicles are more likely to be quickly re-sold by the owner thereby likely increasing the total number of previous owners as compared to another category or type of vehicle. On the contrary, pickup trucks are more utilitarian in nature and therefore, more likely to have fewer owners. As a consequence, a pickup truck with three owners would raise more suspicions which would negatively impact the price, than would a convertible. The price adjustments based on the number of previous owners and the category or type of vehicle may be modeled as an equation or be empirically derived, for example, using surveys of consumers for various different categories or types of vehicles, or determined in any other appropriate manner.

Ownership location patterns can also impact the price adjustment for the vehicle in conjunction with the number of previous owners in that car buyers typically view a vehicle which has bounced around the country with suspicion and discount these vehicles accordingly. On the contrary, they typically appreciate, and find it reassuring, when a vehicle which has been driven in the same region over a period of time. For example, a six-year-old Jeep Cherokee being sold in Dallas, Tex. with three owners, which has been owned solely in the Dallas area may not see any value adjustment based on ownership location patterns. This vehicle is in the "norm" of what a Dallas buyer could expect. However, the same six year-old Jeep Cherokee being sold in Dallas with three previous owners, located in Seattle, Wash.; Baton Rouge, La.; and Boston, Mass. would raise suspicions in the same buyer who would question: "Why has that vehicle been all over the country?" As a consequence, the buyer may discount the value of this vehicle by, for example, 4%. The price adjustments based on the number of previous owners and the ownership location patterns may be modeled as an equation or be empirically derived, for example, using surveys of consumers for various different vehicles having various ranges of prices, or determined in any appropriate manner.

Irregularities in the ownership time patterns may also impact the price adjustment of the vehicle in conjunction with the number of previous owners, the premise also being that something in the ownership history of the car raises doubt in the car buyer's mind as to the reliability of the vehicle. Consider an example of an eight year-old Chevy Malibu that has been owned by three owners, respectively three years, two years and three years. The length of ownership for each owner is likely to be expected so that such ownership times do not raise any doubts. Correspondingly, there may not be any price adjustment in view of the length of ownership time periods. However, the same eight year-old Chevy Malibu with three owners who have owned the car respectively seven years, six months, and five months will raise doubts to the buyer and beg the question: "Why did the last two owners sell the car? Is there something very wrong with this vehicle that I don't know?" In this case, the car-buyer will likely want to pay less for the vehicle because of the uncertainty this irregular ownership pattern creates. Price adjustment linked to this irregular ownership time pattern may be −10% of base price, for example. Again, the price adjustments based on the number of previous owners and the ownership pattern irregularity may be modeled as an equation or be empirically derived, for example, using surveys of consumers for various different vehicles having various ranges of prices, or alternatively, determined in any appropriate manner.

As in the previous factor, irregularities in the ownership mileage patterns among owners in conjunction with the number of previous owners, will raise doubts about the reliability of the car and manifest themselves as a discount in the price of the vehicle. Take the example of a six-year old Chrysler minivan owned by three owners, for two years each, and driven 22,000 miles, 10,000 miles and 20,000 miles, respectively, for a total of 52,000 miles. This is a fairly regular mileage pattern and below the national average of 12,000 miles per year. One would not expect any price adjustment for this mileage pattern, other than the adjustment generated by the overall mileage which is already taken into account in the base price for the vehicle. However, consider the same six-year old Chrysler minivan that has instead been owned by three owners, two years each, and driven respectively 45,000 miles, 5,000 miles and 2,000 miles for a total of 52,000 miles. Now, the mileage of the last two owners is very low, well below the national average which begs the questions in the buyer's mind: "What happened to this vehicle to have been driven so little by the last two owners? Was it in a garage all that time? On cinderblocks in someone's backyard? Was it in the shop?" Again, the uncertainty created by this irregular pattern will lead the buyer to lower the price for the vehicle the buyer is willing to pay by a price adjustment, for example, −12%. The price adjustments based on the number of previous owners and the mileage pattern irregularity may be modeled as an equation or be empirically derived, for example, using surveys of consumers for various different vehicles having various ranges of prices, or alternatively, determined in any appropriate manner.

Of course, the above noted factors that may impact vehicle price adjustment in conjunction with the number of previous owners are merely exemplary and other additional factors may be utilized, or as alternatives. It should also be evident that price adjustments for such noted factors may be determined by the pricing module 40 in any appropriate manner. For example, surveys similar to that shown in FIG. 12 may be utilized to obtain empirical data for vehicle price adjustments based on the factors in conjunction with the number of owners. Of course, the price adjustments may also be assigned or otherwise be determined in any appropriate manner. As described previously, price adjustments can be expressed either as an absolute amount, for example +$300.00, −$560.00, etc., or as a percentage of the base price, for example, +5%, −10% of the base price, etc. for each of these factors. The data indicating the price adjustments for each of the factors may be retained by the pricing module 40 in a look up matrix similar to that shown in FIG. 15, or be retained in any other appropriate manner as well. For example, price adjustments for each of the factors are correlated with each other and retained in a multi-dimensional data structure so that once the various factors associated with a particular vehicle being analyzed is determined, the price adjustment can be readily retrieved and provided to the user.

Any appropriate method may be used by the pricing module 40 to adjust the price of the vehicle when two or more of the above noted factors are used to generate the actual adjustment of the vehicle base price. For example, in one implementation, the price adjustments for each of the various factors that are used may be simply combined together to derive a final price adjustment which is then utilized to adjust the base price of the vehicle. For a particular vehicle being analyzed, if the ownership module 38 analyzes the various factors noted above and the pricing module 40 determines that the price adjustments for each factor as a dollar amount is as follows: the age of the vehicle, −$400; the price point of the vehicle, +$100; category or type of vehicle, +5$100; ownership location patterns, +$200; ownership time patterns, +100; and ownership mileage patterns, $0, the total price adjustment would be +$100.

Of course, as previously noted, the price adjustments may also be expressed as percentages of the base price, or in any other appropriate manner.

Alternatively, in another implementation, the price adjustments of each of the various factors may be applied to a mathematical formulation to derive a final price adjustment, the mathematical formulation weighing the factors differently so that certain factors influence the final price adjustment more than other factors. For a particular vehicle being analyzed, assume that the ownership module 38 analyzes the various factors noted above and the pricing module 40 determines that the price adjustments for each factor as percent of the base price is as follows: the age of the vehicle, +5%; the price point of the vehicle, −2%; category or type of vehicle, +2%; ownership location patterns, +4%; ownership time patterns, 0%; and ownership mileage patterns, +2%. The pricing module 40 may be adapted to apply these price adjustments to a mathematical formulation which dictates that the age of the vehicle and the ownership mileage patterns provide the most accurate assessment of the price adjustment and that the other factors should be discounted by half in determining the final price adjustment.

Thus, in the above example, the total price adjustment would be +9% (+5−2*0.5+2*0.5+4*0.5+0*0.5+2=+9%) so that the base price of the vehicle should be adjusted upward by 9%. Of course, as previously noted, the price adjustments may also be expressed as actual adjustment amounts to the base price, or in any other appropriate manner. It should be noted that the above mathematical formulation is a relatively simple example and more complicated models may be derived and used in other embodiments.

It should be evident to one of ordinary skill in the art that even if the price adjustments for each of the factors are correlated with each other as discussed previously and retained in a multi-dimensional data structure, the correlation of these price adjustments may utilize mathematical formulations such as the one described above.

In view of the above discussion, it should now be evident to one of ordinary skill in the art, how the present invention provides a novel method and system that allows accurate determination of the number of owners for a vehicle. In this regard, as described previously, the present invention allows determination of records generated as a result of relocation, first owners, and ownership transfers. Moreover, the present invention also provides a novel method and system for determining the price adjustment for the vehicle based on various factors, including the number of owners, the age of the vehicle, the price point of vehicle, category or type of vehicle, ownership location patterns, ownership time patterns, and ownership mileage patterns. Thus, the present invention allows the user to obtain more accurate determination of the value of the particular vehicle analyzed.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed:
1. A computer-implemented method comprising:
obtaining, from a client device, a vehicle identification number assigned to a vehicle;
retrieving, from one or more record databases, historical data for the vehicle using the obtained vehicle identification number;

extracting, by a vehicle history unit and from one or more target records in the historical data, data indicating at least one of: (i) a first ownership of the vehicle, (ii) a change of address associated with the vehicle and no change in ownership of the vehicle, and (iii) a change in ownership of the vehicle, wherein the vehicle history unit is connected to the one or more record databases and wherein extracting, from the one or more target records in the historical data, data indicating the first ownership of the vehicle, comprises:
  selecting a target record from the historical data that is determined as a first target record for the vehicle and that is not indicative of a change of address associated with the vehicle;
  determining whether a date associated with the selected target record is within a threshold time period of a model year of the vehicle;
  responsive to determining that the data associated with the selected target record is within the threshold time period of the model year of the vehicle, determining whether the selected target record satisfies a first ownership criterion by evaluating at least one of (i) an odometer reading of the selected target record being less than a determined mileage threshold, (ii) a second record in the historical data being indicative of a use of the vehicle within a threshold period of time after a data associated with the selected target record, or (iii) a third record in the historical data being indicative of an assembly of the vehicle within a threshold period of time before a date associated with the selected target record; and
  applying a first ownership flag to the selected target record in response to determining that the selected target record satisfies the first ownership criterion;
determining, by the vehicle history unit, a number of owners based on the extracted data indicating at least one of: (i) the first ownership of the vehicle, (ii) the change of address associated with the vehicle with no change in ownership of the vehicle, and (iii) the change in ownership of the vehicle;
determining, by the vehicle history unit, a customized price for the vehicle based on a base price of the vehicle and the number of owners of the vehicle, wherein determining the customized price for the vehicle comprises adjusting the base price of the vehicle based on the comparison of the number of owners of the vehicle with a number of owners of other comparable vehicles; and
providing, by a communications managing module that is connected together with the vehicle history unit, the customized price for the vehicle to the client device through a graphical user interface of the client device.

2. The computer-implemented method of claim 1, wherein:
  the one or more target records comprise title or registration information of the vehicle; and
  the extracted data does not include information indicative of one or more of duplicate titles, a title assigned to a vehicle dealer, lien discharges, and title error correction.

3. The computer-implemented method of claim 1, wherein extracting, from the one or more target records in the historical data, the data indicating the change of address associated with the vehicle and no change in ownership of the vehicle comprises:
  identifying, by the vehicle history unit, the first target record corresponding to an issued title or registration of the vehicle; and
  identifying, by the vehicle history unit, a second target record corresponding to a title or registration of the vehicle issued before the title or registration of the vehicle in the first target record;
  determining, by the vehicle history unit, whether a first address in the first target record is different from a second address in the second target record;
  responsive to determining that the first address is different from the second address, determining whether supplementary data corroborates a move from the second address to the first address; and
  determining, by the vehicle history unit, that the first target record includes data indicative of the change of address associated with the vehicle and no change in ownership of the vehicle in response to supplementary data corroborating the move from the second address to the first address and vehicle ownerships in the first target record and the second target record being the same.

4. The computer-implemented method of claim 1, wherein extracting, from one or more target records in the historical data, the data indicating the change in ownership of the vehicle comprises:
  selecting, by the vehicle history unit, a particular target record from the one or more target records that includes title or registration information of the vehicle;
  identifying a user confirmation record that indicates the sale of the vehicle, wherein the user confirmation record is generated based on information obtained from a user survey;
  determining, by the vehicle history unit, that the date associated with the user confirmation record is within a threshold time period of the date of the particular target record; and
  applying, by the vehicle history unit, an ownership change flag to the particular target record in response to determining that the date associated with the user confirmation record is within the threshold time period of the date of the particular target record.

5. The computer-implemented method of claim 1, wherein extracting, from one or more target records in the historical data, the data indicating the change in ownership of the vehicle comprises:
  selecting, by the vehicle history unit, a particular target record from the one or more target records that includes title or registration information of the vehicle;
  determining, by the vehicle history unit, that the particular target record (i) was not issued as a result of relocation of the vehicle, and (ii) is not associated with a first ownership flag for the vehicle;
  determining, by the vehicle history unit, whether the particular target record satisfies an ownership change criterion; and
  applying, by the vehicle history unit, an ownership change flag to the particular target record in response to determining that the particular target record satisfies the ownership change criterion.

6. The computer-implemented method of claim 5, wherein the ownership change criterion comprises one or more of:
  an indication of a vehicle sale of the vehicle within a first threshold period of time of a date associated with the particular target record;

a purchase of a warranty or service plan for the vehicle within a second threshold period of time before a date associated with the particular target record;

an indication of dealer usage associated with the vehicle within a third threshold period of time before a date associated with the particular target record; and an indication of a sale or purchase by an owner of the vehicle within a fourth threshold period of time before a date associated with the particular target record.

7. The computer-implemented method of claim 6, wherein the indication of the vehicle sale of the vehicle comprises one of:

an indication of a sale of the vehicle by one of a dealer, an auctioneer, a rental company, a fleet management company; and a certified sale of the vehicle.

8. A system comprising:

one or more computers and one or more storage devices storing instructions that are operable and when executed by one or more computers, cause the one or more computers to perform actions comprising:

obtaining, from a client device, a vehicle identification number assigned to a vehicle;

retrieving, from one or more record databases, historical data for the vehicle using the obtained vehicle identification number;

extracting, by a vehicle history unit and from one or more target records in the historical data, data indicating at least one of: (i) a first ownership of the vehicle, (ii) a change of address associated with the vehicle and no change in ownership of the vehicle, and (iii) a change in ownership of the vehicle, wherein the vehicle history unit is connected to the one or more record databases and wherein extracting, from the one or more target records in the historical data, data indicating the first ownership of the vehicle, comprises:

selecting a target record from the historical data that is determined as a first target record for the vehicle and that is not indicative of a change of address associated with the vehicle;

determining whether a date associated with the selected target record is within a threshold time period of a model year of the vehicle;

responsive to determining that the data associated with the selected target record is within the threshold time period of the model year of the vehicle, determining whether the selected target record satisfies a first ownership criterion by evaluating at least one of (i) an odometer reading of the selected target record being less than a determined mileage threshold, (ii) a second record in the historical data being indicative of a use of the vehicle within a threshold period of time after a data associated with the selected target record, or (iii) a third record in the historical data being indicative of an assembly of the vehicle within a threshold period of time before a date associated with the selected target record; and applying a first ownership flag to the selected target record in response to determining that the selected target record satisfies the first ownership criterion;

determining, by the vehicle history unit, a number of owners based on the extracted data indicating at least one of: (i) the first ownership of the vehicle, (ii) the change of address associated with the vehicle with no change in ownership of the vehicle, and (iii) the change in ownership of the vehicle;

determining, by the vehicle history unit, a customized price for the vehicle based on a base price of the vehicle and the number of owners of the vehicle, wherein determining the customized price for the vehicle comprises adjusting the base price of the vehicle based on the comparison of the number of owners of the vehicle with a number of owners of other comparable vehicles; and providing, by a communications managing module that is connected together with the vehicle history unit, the customized price for the vehicle to the client device through a graphical user interface of the client device.

9. The system of claim 8, wherein:

the one or more target records comprise title or registration information of the vehicle; and the extracted data does not include information indicative of one or more of duplicate titles, a title assigned to a vehicle dealer, lien discharges, and title error correction.

10. The system of claim 8, wherein extracting, from the one or more target records in the historical data, the data indicating the change of address associated with the vehicle and no change in ownership of the vehicle comprises:

identifying, by the vehicle history unit, the first target record corresponding to an issued title or registration of the vehicle; and identifying, by the vehicle history unit, a second target record corresponding to a title or registration of the vehicle issued before the title or registration of the vehicle in the first target record;

determining, by the vehicle history unit, whether a first address in the first target record is different from a second address in the second target record;

responsive to determining that the first address is different from the second address, determining whether supplementary data corroborates a move from the second address to the first address; and determining, by the vehicle history unit, that the first target record includes data indicative of the change of address associated with the vehicle and no change in ownership of the vehicle in response to supplementary data corroborating the move from the second address to the first address and vehicle ownerships in the first target record and the second target record being the same.

11. The system of claim 8, wherein extracting, from one or more target records in the historical data, the data indicating the change in ownership of the vehicle comprises:

selecting, by the vehicle history unit, a particular target record from the one or more target records that includes title or registration information of the vehicle;

determining, by the vehicle history unit, that the particular target record (i) was not issued as a result of relocation of the vehicle, and (ii) is not associated with a first ownership flag for the vehicle;

determining, by the vehicle history unit, whether the particular target record satisfies an ownership change criterion;

and applying, by the vehicle history unit, an ownership change flag to the particular target record in response to determining that the particular target record satisfies the ownership change criterion.

12. The system of claim 11, wherein the ownership change criterion comprises one or more of:

an indication of a vehicle sale of the vehicle within a first threshold period of time of a date associated with the particular target record;
a purchase of a warranty or service plan for the vehicle within a second threshold period of time before a date associated with the particular target record;
an indication of dealer usage associated with the vehicle within a third threshold period of time before a date associated with the particular target record; and
an indication of a sale or purchase by an owner of the vehicle within a fourth threshold period of time before a date associated with the particular target record, and
wherein the indication of the vehicle sale of the vehicle comprises one of:
an indication of a sale of the vehicle by one of a dealer, an auctioneer, a rental company, a fleet management company; and
a certified sale of the vehicle.

13. A non-transitory computer-readable storage medium comprising instructions, which, when executed by one or more computers, cause the one or more computers to perform actions comprising:
obtaining, from a client device, a vehicle identification number assigned to a vehicle;
retrieving, from one or more record databases, historical data for the vehicle using the obtained vehicle identification number;
extracting, by a vehicle history unit and from one or more target records in the historical data, data indicating at least one of: (i) a first ownership of the vehicle, (ii) a change of address associated with the vehicle and no change in ownership of the vehicle, and (iii) a change in ownership of the vehicle, wherein the vehicle history unit is connected to the one or more record databases and wherein extracting, from the one or more target records in the historical data, data indicating the first ownership of the vehicle, comprises:
selecting a target record from the historical data that is determined as a first target record for the vehicle and that is not indicative of a change of address associated with the vehicle;
determining whether a date associated with the selected target record is within a threshold time period of a model year of the vehicle;
responsive to determining that the data associated with the selected target record is within the threshold time period of the model year of the vehicle, determining whether the selected target record satisfies a first ownership criterion by evaluating at least one of (i) an odometer reading of the selected target record being less than a determined mileage threshold, (ii) a second record in the historical data being indicative of a use of the vehicle within a threshold period of time after a data associated with the selected target record, or (iii) a third record in the historical data being indicative of an assembly of the vehicle within a threshold period of time before a date associated with the selected target record; and
applying a first ownership flag to the selected target record in response to determining that the selected target record satisfies the first ownership criterion;
determining, by the vehicle history unit, a number of owners of the vehicle based on the extracted data indicating at least one of: (i) the first ownership of the vehicle, (ii) the change of address associated with the vehicle with no change in ownership of the vehicle, and (iii) the change in ownership of the vehicle;
determining, by the vehicle history unit, a customized price for the vehicle based on a base price of the vehicle and the number of owners of the vehicle, wherein determining the customized price for the vehicle comprises adjusting the base price of the vehicle based on the comparison of the number of owners of the vehicle with a number of owners of other comparable vehicles; and
providing, by a communications managing module that is connected together with the vehicle history unit, the customized price for the vehicle to the client device through a graphical user interface of the client device.

14. The non-transitory computer-readable storage medium of claim 13, wherein:
the one or more target records comprise title or registration information of the vehicle; and
the extracted data does not include information indicative of one or more of duplicate titles, a title assigned to a vehicle dealer, lien discharges, and title error correction.

15. The non-transitory computer-readable storage medium of claim 13, wherein extracting, from the one or more target records in the historical data, the data indicating the change of address associated with the vehicle and no change in ownership of the vehicle comprises:
identifying, by the vehicle history unit, the first target record corresponding to an issued title or registration of the vehicle; and
identifying, by the vehicle history unit, a second target record corresponding to a title or registration of the vehicle issued before the title or registration of the vehicle in the first target record;
determining, by the vehicle history unit, whether a first address in the first target record is different from a second address in the second target record;
responsive to determining that the first address is different from the second address, determining whether supplementary data corroborates a move from the second address to the first address; and
determining, by the vehicle history unit, that the first target record includes data indicative of the change of address associated with the vehicle and no change in ownership of the vehicle in response to supplementary data corroborating the move from the second address to the first address and vehicle ownerships in the first target record and the second target record being the same.

16. The non-transitory computer-readable storage medium of claim 13, wherein extracting, from one or more target records in the historical data, the data indicating the change in ownership of the vehicle comprises:
selecting, by the vehicle history unit, a particular target record from the one or more target records that includes title
or registration information of the vehicle;
determining, by the vehicle history unit, that the particular target record (i) was not issued as a result of relocation of the vehicle, and (ii) is not associated with a first ownership flag for the vehicle;
determining, by the vehicle history unit, whether the particular target record satisfies an ownership change criterion; and
applying, by the vehicle history unit, an ownership change flag to the particular target record in response to determining that the particular target record satisfies the ownership change criterion.

17. The non-transitory computer-readable storage medium of claim 16, wherein the ownership change criterion comprises one or more of:
- an indication of a vehicle sale of the vehicle within a first threshold period of time of a date associated with the particular target record;
- a purchase of a warranty or service plan for the vehicle within a second threshold period of time before a date associated with the particular target record;
- an indication of dealer usage associated with the vehicle within a third threshold period of time before a date associated with the particular target record; and
- an indication of a sale or purchase by an owner of the vehicle within a fourth threshold period of time before a date associated with the particular target record, and
- wherein the indication of the vehicle sale of the vehicle comprises one of:
  - an indication of a sale of the vehicle by one of a dealer, an auctioneer, a rental company, a fleet management company; and
- a certified sale of the vehicle.

* * * * *